(12) United States Patent
Kitamura et al.

(10) Patent No.: US 11,496,653 B2
(45) Date of Patent: Nov. 8, 2022

(54) MEASUREMENT RECORDING SYSTEM AND MEASUREMENT RECORDING METHOD

(71) Applicant: Shimadzu Corporation, Kyoto (JP)

(72) Inventors: Masuto Kitamura, Kyoto (JP); Hirotaka Sato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/365,556

(22) Filed: Jul. 1, 2021

(65) Prior Publication Data

US 2022/0006923 A1    Jan. 6, 2022

(30) Foreign Application Priority Data

Jul. 2, 2020    (JP) .............................. JP2020-115201

(51) Int. Cl.
| | |
|---|---|
| H04N 5/12 | (2006.01) |
| H04N 5/247 | (2006.01) |
| H04N 5/77 | (2006.01) |
| H04N 5/91 | (2006.01) |
| H04N 17/00 | (2006.01) |
| H04N 17/06 | (2006.01) |
| H04N 5/04 | (2006.01) |
| H04N 7/18 | (2006.01) |

(52) U.S. Cl.
CPC ............... *H04N 5/12* (2013.01); *H04N 5/247* (2013.01); *H04N 5/772* (2013.01); *H04N 5/91* (2013.01); *H04N 17/002* (2013.01); *H04N 17/06* (2013.01)

(58) Field of Classification Search
None
See application file for complete search history.

(56) References Cited

U.S. PATENT DOCUMENTS

| | | | |
|---|---|---|---|
| 5,898,461 A | | 4/1999 | Ohsawa et al. |
| 9,804,577 B1 * | | 10/2017 | Troy ................... G01N 29/4472 |
| 2018/0336930 A1 * | | 11/2018 | Takahashi .......... H04N 21/8547 |
| 2019/0348076 A1 * | | 11/2019 | Hershfield ............. H04N 7/181 |
| 2021/0125409 A1 * | | 4/2021 | Mirza ................... G06T 19/006 |

FOREIGN PATENT DOCUMENTS

| | | | | |
|---|---|---|---|---|
| JP | H07193786 A | | 7/1995 | |
| WO | WO 2019/086861 | * | 5/2019 | ............. G16H 10/00 |
| WO | 2020079780 A1 | | 4/2020 | |

* cited by examiner

*Primary Examiner* — Hung Q Dang
(74) *Attorney, Agent, or Firm* — Muir Patent Law, PLLC

(57) ABSTRACT

A measurement recording system is configured to measure timing information for correcting out-of-synchronization of a time axis between a first captured video and a second captured video and correct the out-of-synchronization to align the start timing between the first captured video and the second captured video based on the measured timing information.

16 Claims, 7 Drawing Sheets

MEASUREMENT RECORDING SYSTEM AND MEASUREMENT RECORDING METHOD

CROSS-REFERENCE TO RELATED APPLICATIONS

The priority application number JP2020-115201, entitled "MEASUREMENT RECORDING SYSTEM AND MEASUREMENT RECORDING METHOD" filed on Jul. 2, 2020, and invented by Masuto KITAMURA and Hirotaka SATO, upon which this patent application is based, is herein incorporated by reference in its entirety.

BACKGROUND OF THE INVENTION

Field of the Invention

The present invention relates to a measurement recording system and a measurement recording method, particularly to a measurement recording system provided with a recording device for recording a plurality of videos different from each other and a measurement recording method.

Description of the Background Art

Conventionally, an aircraft inspection support device for storing (recording) a measurement information image and an inspection target image is known. Such an aircraft inspection support device is disclosed, for example, in WO 2020/079780.

An aircraft inspection support device described in WO 2020/079780 is provided with an imaging unit for capturing a measurement information image of a measuring instrument-side display unit of a measuring instrument for inspecting an inspection target. The aircraft inspection support device described in WO 2020/079780 is provided with an imaging unit for imaging, as an inspection target image, an area corresponding to the field of view of the inspection operator, including the inspection target. The aircraft inspection support device stores a measurement information image and an inspection target image captured by the two different imaging units in association with each other.

Although not described in the above-described WO 2020/079780, however, when storing a plurality of images captured by two or more different imaging units in association with each other, there is a case in which the plurality of stored images may include out-of-synchronization of a time axis.

That is, even when an instruction for recording a plurality of videos is issued at the same timing in order to simultaneously store (record) a plurality of videos, there is a case in which the plurality of videos include out-of-synchronization of a time axis due to the variations in the time required for the processing for recording each of the plurality of videos. For this reason, the start time (start timing) of the video may be shifted in the plurality of recorded videos.

In such a case, since the timing of the video to be played is shifted, the played videos cannot be compared at the same timing. For this reason, when recording a plurality of videos captured by a plurality of different imaging units based on an instruction at the same timing, it is desired to play the recorded videos with the timings aligned.

SUMMARY OF THE INVENTION

The present invention has been made in order to solve the above-described problems. An object of the present invention is to provide a measurement recording system and a measurement recording method capable of recording a plurality of videos so that the plurality of videos can be played with timing aligned in a case where the plurality of videos is recorded by a plurality of different imaging units.

In order to attain the above-described object, a measurement recording system according to a first aspect of the present invention includes:

a plurality of imaging units each configured to capture a video and transmit captured video information; and a recording device including a first recording unit and a second recording unit, the first recording unit being configured to record a first captured video based on first video information from a first imaging unit out of the plurality of imaging units, and the second recording unit being configured to record a second captured video based on second video information from a second imaging unit out of the plurality of imaging units, wherein the recording device is configured to measure timing information for correcting out-of-synchronization of a time axis between the first captured video to be recorded by the first recording unit and the second captured video to be recorded by the second recording unit, and correct the out-of-synchronization to align start timing of the first captured video and start timing of the second captured video, based on the measured timing information.

A measurement recording method according to a second aspect of the present invention includes the steps of:

recording a first captured video based on first video information captured by a first imaging unit out of a plurality of imaging units;

recording a second captured video based on second video information captured by a second imaging unit out of the plurality of imaging units;

measuring timing information for correcting out-of-synchronization of a time axis between the first captured video to be recorded and the second captured video to be recorded; and correcting out-of-synchronization to align a start timing between the first captured video and the second captured video based on the measured timing information.

In the measurement recording system according to the above-described first aspect of the present invention and the measurement recording method according to the above-described second aspect of the present invention, measure timing information for correcting the out-of-synchronization of the time axis between the first captured video to be recorded and the second captured video to be recorded is measured. With this, based on the measured timing information, the magnitude of the out-of-synchronization of the time axis between the first captured video to be recorded and the second captured video to be recorded can be measured. Therefore, the videos can be corrected to eliminate the out-of-synchronization based on the magnitude of the out-of-synchronization of the time axis between the first captured video and the second captured video. Consequently, when recording a plurality of videos captured by a plurality of different imaging units, it becomes possible to record them so as to be able to be played with the timings aligned.

Further, the timing information for correcting the out-of-synchronization of the time axis between the first captured video to be recorded and the second captured video to be recorded is measured by the recording device. Therefore, even in a case where a plurality of imaging units does not have a time code function for giving a time axis to the captured image, the out-of-synchronization of the videos to be recorded can be easily corrected by measuring the timing information by the recording device. As a result, the videos can be easily recorded so that the videos can be played with the timings aligned.

Further, it is possible to perform recording so that the videos can be played with the timings aligned without using a time code function. Therefore, the first recording unit 34d starts the control processing for preparing the recording of the captured video R1 based on the recording instruction and outputs the first preparation completion information S1 indicating the completion of the preparation to the timer unit 34f and start the recording of the captured video R1 at the timing at which the preparation for starting the recording of the captured video R1 is completed. It is unnecessary to synchronize the time axes of a plurality of imaging units in advance in order to use a time code function, and it is possible to reduce the workload required for recording so that the videos can be played with the timings aligned.

DESCRIPTION OF THE PREFERRED EMBODIMENT

Hereinafter, some embodiments in which the present invention is embodied will be described with reference to the attached drawings.

First Embodiment

Referring to FIG. 1 to FIG. 5, a configuration of a measurement recording system 100 according to a first embodiment of the present invention will be described.
(Configuration of Measurement Recording System)

Figure 1:
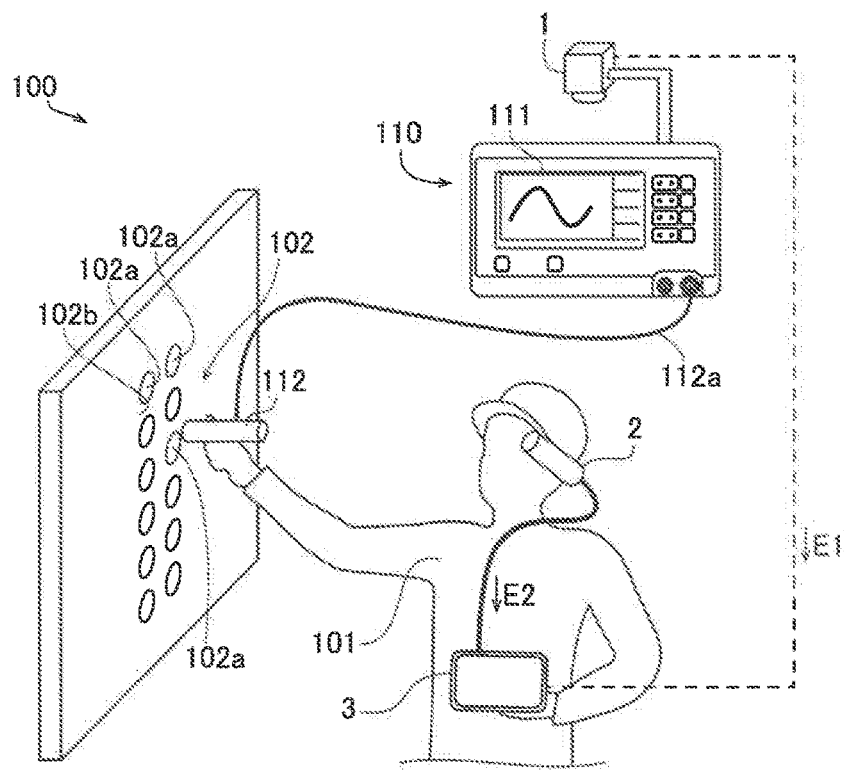
FIG. 1 is a schematic diagram showing a configuration of a measurement recording system according to a first embodiment.

As shown in FIG. 1, a measurement recording system 100 according to the first embodiment is configured as a device for supporting an inspection operator 101 performing an inspection operation to an inspection target 102 by using a measuring instrument 110 in the vicinity of the inspection target 102. Specifically, the inspection target 102 is parts of an aircraft and is a rivet 102a for joining a plurality of plates constituting the body of the aircraft and a portion 102b of the plate in the vicinity of the rivet 102a. That is, the inspection target 102 is the rivet fastened portion and the vicinity of the rivet fastened portion.

Note that the vicinity of the inspection target 102 is described to mean, for example, a range of a position (a position where it is accessible to the inspection target 102) where an inspection operator 101 can bring a measuring probe 112, which will be described later, into contact with the inspection target 102. Specifically, the vicinity of the inspection target 102 denotes, for example, an area including the inspection target 102 and a working position (scaffold portion) facing the inspection target 102.

The interval between the plurality of rivets 102a is, for example, about 1 inch to about several inches. As shown in FIG. 1, the plurality of rivets 102a is arranged in a matrix on the plate. There are tens of thousands of rivets 102a per aircraft. In this inspection, the inspection is performed for all of the rivets 102a by using the measuring instrument 110 for, e.g., the fatigued state of the rivet 102a and occurrences of cracks from the rivet hole in the portions 102b of the plate. The inspection operator 101 performs the inspection in a state in which, for example, the inspection operator is on the scaffold provided along the body of the aircraft.

The measuring instrument 110 includes a measuring instrument-side display unit 111 and a measuring probe 112 as shown in FIG. 1. The measuring instrument 110 acquires measurement information by the inspection of the inspection target 102 using the measuring probe 112. The measuring instrument 110 is configured as, for example, an eddy current crack detection instrument or an ultrasonic test equipment. Further, the measuring instrument 110 is installed at a position spaced apart from the inspection operator 101 performing the inspection.

The measuring instrument-side display unit 111 is provided on one side of the measuring instrument body. Also, the measuring instrument-side display unit 111 is configured, for example, as a cathode ray tube, a liquid crystal display, a needle-to-scale combination, or as an indicator lamp. Then, the measuring instrument-side display unit 111 is configured to display the measurement signal from the measuring probe 112 as measurement information. The measurement information is a measurement result (inspection result) of the inspection target 102 measured by the measuring instrument 110. For example, the measurement information is configured as a wave, a numerical value, a deflection position of a needle, or lighting of an indicator light.

The measuring probe 112 is connected to the main body of the measuring instrument 110 via a cable 112a and is configured to transmit a measurement signal to the main body of the measuring instrument 110. The measuring probe 112 is held (grasped) by the inspection operator 101 to inspect the inspection target 102. The measuring probe 112 is configured by, for example, a pen-shaped probe.

Figure 2:
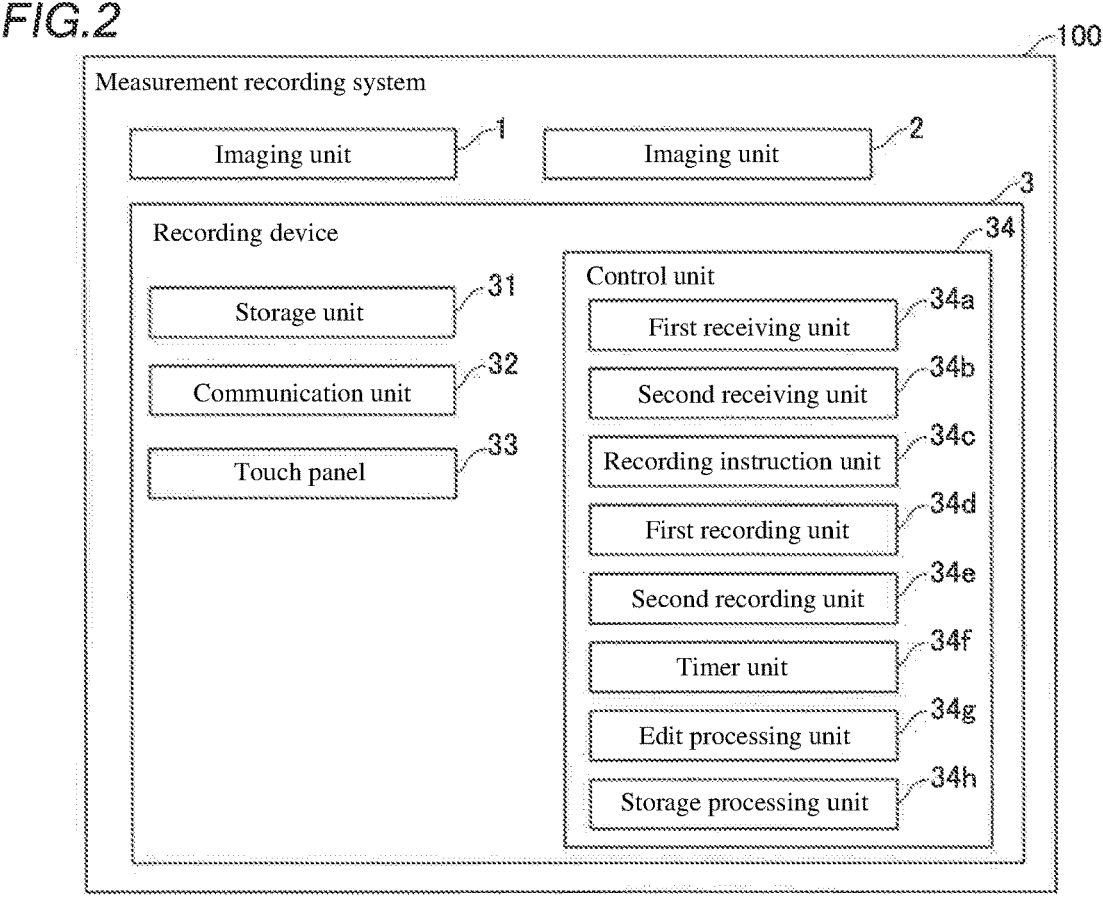
FIG. 2 is a block diagram for explaining an entire configuration of the measurement recording system according to the first embodiment.

As shown in FIG. 2, the measurement recording system 100 according to the first embodiment is provided with a plurality of imaging units (an imaging unit 1 and an imaging unit 2) and a recording device 3. The imaging unit 1 is an example of the "first imaging unit" recited in claims. The imaging unit 2 is an example of the "second imaging unit" recited in claims.

Figure 4:
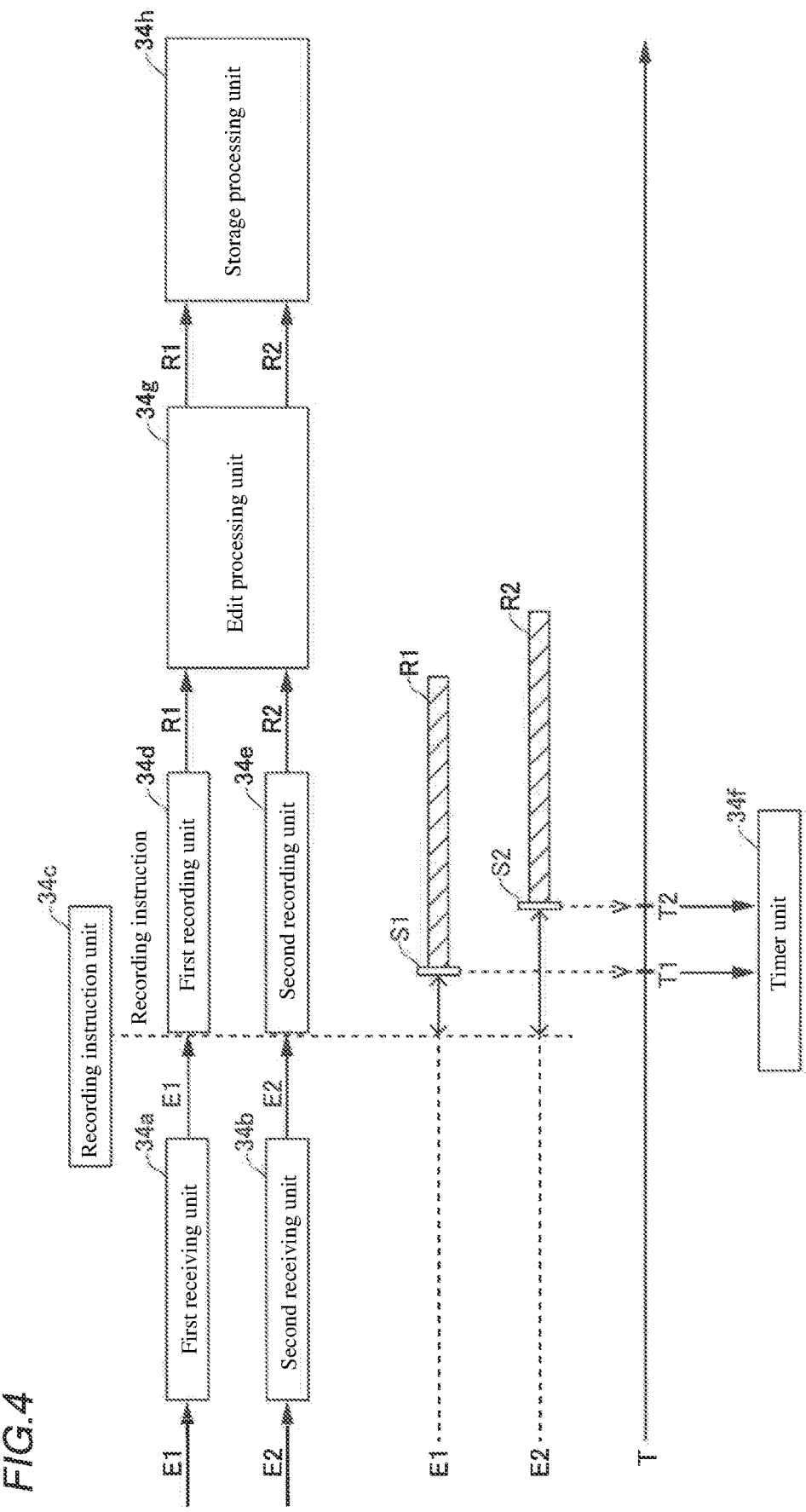
FIG. 4 is a diagram for explaining the control processing of a recording device according to the first embodiment.

In the first embodiment, a plurality of imaging units (the imaging unit 1 and the imaging unit 2) captures a video and transmits the captured video information (the video information E1 and the video information E2) (see FIG. 4). Note that the video information E1 is an example of the "first video information" and the "measuring instrument video information" recited in claims. Further, the video information E2 is an example of the "second video information" and the "inspection target video information" recited in claims.

In the first embodiment, the imaging unit 1 images the measuring instrument-side display unit 111 that displays the measurement information related to the inspection target 102 measured by the measuring instrument 110. Specifically, the imaging unit 1 images the measuring instrument-side display unit 111 such that the measurement information displayed on the measuring instrument-side display unit 111 of the measuring instrument 110 can be visually recognized by inspecting the inspection target 102 by the inspection operator 101. The imaging unit 1 is configured by, for example, a camera or a combination of a light detecting element and an optical component (a mirror, a lens, and a filter, etc.).

Further, in the imaging unit 1, the relative position to the measuring instrument 110 is fixed. For example, the imaging unit 1 is arranged at a position (front) facing the measuring instrument-side display unit 111 of the measuring instrument 110 by an arm-shaped fixing member, such as, e.g., a coupling member (a joint). That is, in the first embodiment, the imaging unit 1 is provided at a position spaced apart from the inspection operator 101 performing the inspection operation.

Further, in the first embodiment, the imaging unit 1 is configured to transmit the video information E1 acquired by imaging the measuring instrument-side display unit 111 of the measuring instrument 110 to the recording device 3 to be described later. The imaging unit 1 is configured to be able to communicate with the recording device 3 by wireless connection, such as, e.g., short-range wireless communication used in a wireless LAN, a Bluetooth (registered trademark), and an RF tag, and other infrared-ray communication. The imaging unit 1 transmits the captured video information E1 as a radio signal of a digital signal. The video information E1 is continuously transmitted as moving image information to the recording device 3.

In the first embodiment, the imaging unit 2 images the inspection target 102 in s state of being inspected by the inspection operator 101. That is, it is configured to image the state of the inspection operation when the inspection is performed by the inspection operator 101. Therefore, the imaging unit 2 images the inspection target 102 so that it is possible to confirm the inspection target 102 when the measurement information is acquired and how the inspection operation is performed on the inspection target 102 when the measurement information is acquired.

Specifically, the imaging unit 2 is configured to image the inspection target 102 such that the angle and the position of the measuring probe 112 with respect to the inspection target 102 can be confirmed. The imaging unit 2 is configured by, for example, a camera or a combination of a light detecting element and an optical component (a mirror, a lens, and a filter, etc.).

The imaging unit 2 is configured to be portable or wearable to the inspection operator 101. Specifically, the imaging unit 2 is mounted on the head of the inspection operator 101 and is configured as a so-called wearable camera. That is, the imaging unit 2 images an area corresponding to the view of the inspection operator 101 performing the inspection operation.

Further, in the first embodiment, the imaging unit 2 is configured to transmit the video information E2 acquired by imaging the imaging inspection target 102 to the recording device 3 to be described later. The imaging unit 1 is configured to be able to communicate with the recording device 3 by means of a wired connection using a device-to-device interface, such as, e.g., a USB cable, and a communication interface, such as, e.g., a wired LAN. While, the imaging unit 2 transmits the captured video information E2 to the recording device 3 as a wired signal of a digital signal. Like the video information E1, the video information E2 is continuously transmitted as video information to the recording device 3.

[Recording Device]

Figure 3:
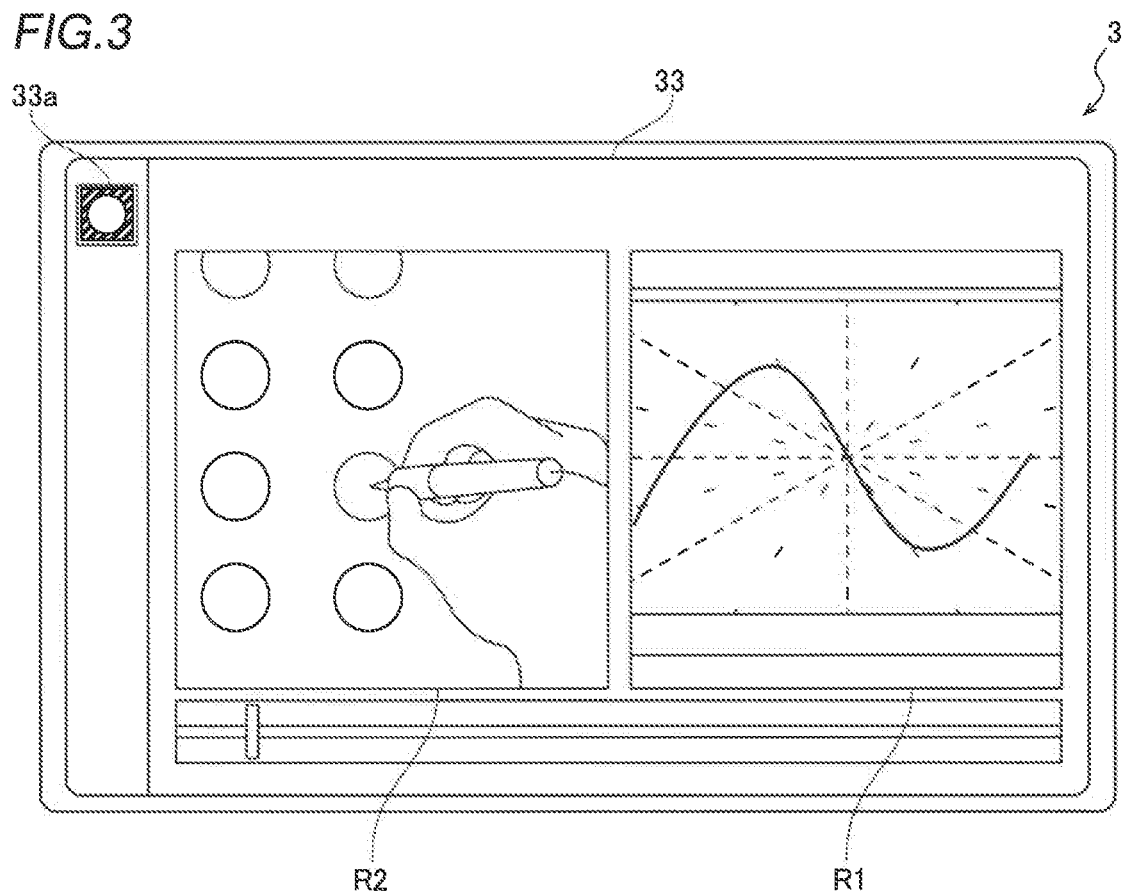
FIG. 3 is a diagram for explaining captured videos according to the first embodiment.

In the first embodiment, the recording device 3 is configured to store (record) the captured video R1 based on the video information E1 from the imaging unit 1 (see FIG. 3) and the captured video R2 based on the video information E2 from the imaging unit 2 (see FIG. 3). Note that the captured video R1 is an example of the "first captured video" recited in claims. The captured video R2 is an example of the "second captured video" recited in claims.

As shown in FIG. 1, the recording device 3 is configured to be portable or wearable to the inspection operator 101. The recording device 3 is, for example, a tablet terminal (a tablet computer) or a mobile information terminal, such as, e.g., a smartphone. Further, as shown in FIG. 2, the recording device 3 includes a storage unit 31, a communication unit 32, a touch panel 33, and a control unit 34.

The storage unit 31 is configured by a storage device including a non-volatile memory, such as, e.g., a flash memory. For example, the storage unit 31 is configured as an SD-card (registered mark). The storage unit 31 stores programs for causing the control unit 34 to function. The storage unit 31 stores the captured video R1 and the captured video R2 under the control of the control unit 34, which will be described later.

The communication unit 32 is configured to be able to communicate with the imaging unit 1 and the imaging unit 2. For example, the communication unit 32 includes an interface for connecting devices, such as, e.g., a USB cable, and a communication interface, such as, e.g., a wired LAN. The communication unit 32 includes a wireless communication module capable of communicating via a short-range wireless communication used in a wireless LAN, a Bluetooth (registered trademark), or an RF tag, or other infrared communication. The communication unit 32 is configured to receive the video information E1 from the imaging unit 1 and the video information E2 from the imaging unit 2.

The touch panel 33 is configured to receive an input operation by the inspection operator 101 for operating the recording device 3. That is, the touch panel 33 receives an input operation for operating the control unit 34. For example, as shown in FIG. 3, the touch panel 33 receives a recording operation for starting recording the captured video R1 and the captured video R2 on the basis that the record button 33a displayed on the touch panel 33 is pressed by the inspection operator 101 (the region of the record button 33a is touched). Note that the touch panel 33 (the record button 33a) is an example of the "recording operation unit" recited in claims.

Further, the touch panel 33 is configured to be able to play an image (video) stored in the storage unit 31 under the control of the control unit 34 to be described later. Specifically, the touch panel 33 displays (plays) the captured video R1 and the captured video R2 stored in the storage unit 31 by the control of the control unit 34.

The control unit 34 is configured to control each part of the recording device 3. The control unit 34 includes a CPU (Central Processing Unit), a GPU (Graphics Processing Unit), a ROM (Read Only Memory), and a RAM (Random Access Memory). The control unit 34 performs the control of each unit of the recording device 3 by executing a predetermined program. The control unit 34 performs the control of storing (recording) the captured video R1 and the captured video R2 by executing a predetermined program.

As shown in FIG. 2, the control unit 34 includes, as functional configurations, a first receiving unit 34a, a second receiving unit 34b, a recording instruction unit 34c, a first recording unit 34d, a second recording unit 34e, a timer unit 34f, an edit processing unit 34g, and a storage processing unit 34h. That is, the control unit 34 functions as the first receiving unit 34a, the second receiving unit 34b, the recording instruction unit 34c, the first recording unit 34d, the second recording unit 34e, the timer unit 34f, the edit processing unit 34g, and the storage processing unit 34h by executing programs.

Note that in FIG. 2, the control unit 34 is illustrated as functional blocks, but is not limited to this example. That is, each unit of the control unit 34 may be configured as a separate hardware (software) or as a single hardware (software).

(Control Processing by Control Unit of Recording Device)

As shown in FIG. 4, the captured video R1 to be recorded by the recording device 3 and the captured video R2 to be recorded by the recording device 3 generate an out-of-synchronization of the time axis at the timing at which the video starts. In the first embodiment, the recording device 3 is configured to correct the out-of-synchronization of the time axis so as to align the start timing between the captured video R1 to be recorded and the captured video R2 to be recorded.

The first receiving unit 34a acquires the video information E1 from the imaging unit 1 via the communication unit 32. The first receiving unit 34a continuously acquires the video information E1 continuously transmitted as video information. Further, similarly to the first receiving unit 34a, the second receiving unit 34b acquires the video information E2 from the imaging unit 2 via the communication unit 32. Similar to the first receiving unit 34a, the second receiving unit 34b continuously acquires the video information E2 continuously transmitted as video information.

The recording instruction unit 34c outputs a recording instruction for causing the first recording unit 34d and the second recording unit 34e to start recording. Specifically, the recording instruction unit 34c outputs, based on the input operation to the record button 33a of the touch panel 33 by the inspection operator 101, a recording instruction for causing the first recording unit 34d and the second recording unit 34e to start the recording.

In the first embodiment, the first recording unit 34d records the captured video R1 based on the video information E1. Specifically, the first recording unit 34d acquires the recording instruction from the recording instruction unit 34c and starts recording the captured video R1 based on the acquisition of the recording instruction.

In the first embodiment, the first recording unit 34d is configured to output the first preparation completion information S1 to the timer unit 34f and starts recording the captured video R1. That is, the first recording unit 34d starts the control processing for preparing the recording of the captured video R1 based on the recording instruction, outputs the first preparation completion information S1 indicating the completion of the preparation to the timer unit 34f at the timing at which the preparation for starting the recording of the captured video R1 is completed, and starts the recording of the captured video R1.

Like the first recording unit 34d, the second imaging unit 34e records the captured video R2 based on the video information E2. Also, like the first recording unit 34d, the second recording unit 34e is configured to output second preparation completion information S2 to the timer unit 34f and start recording the captured video R2 at a timing at which the preparation for starting recording the captured video R2 is completed.

In the first embodiment, the timer unit 34f measures the timing information T for correcting the out-of-synchronization of the time axis between the captured video R1 recorded by the first recording unit 34d and the captured video R2 recorded by the second recording unit 34e. Specifically, the timer unit 34f measures the timing information T indicating a time by measuring the elapsed time.

The timing information T includes, for example, first start timing T1 indicating the timing at which the first recording unit 34d start recording. The first start timing T1 indicates the timing at which the first preparation completion information S1 is acquired by the first recording unit 34d. Similarly, the timing information T includes second start timing T2 indicating the timing at which the second recording unit 34e starts recording. The second start timing T2 indicates the timing at which the second preparation completion information S2 is acquired by the second recording unit 34e.

In the first embodiment, the edit processing unit 34g corrects the out-of-synchronization to align the start timing between the captured video R1 and the captured video R2 based on the measured timing information T. Specifically, the edit processing unit 34g is configured to correct the out-of-synchronization between the captured video R1 and the captured video R2 based on the difference between the first start timing T1 and the second start timing T2.

In particular, the edit processing unit 34g measures the difference between the time of the first start timing T1 at which the first preparation completion information S1 was measured by the timer unit 34f and the time of the second start timing T2 at which the second preparation completion information S2 was measured by the timer unit 34f. The edit processing unit 34g measures the out-of-synchronization between the captured video R1 and the captured video R2 based on the difference between the measured first start timing T1 and the measured second start timing T2.

Figure 5:
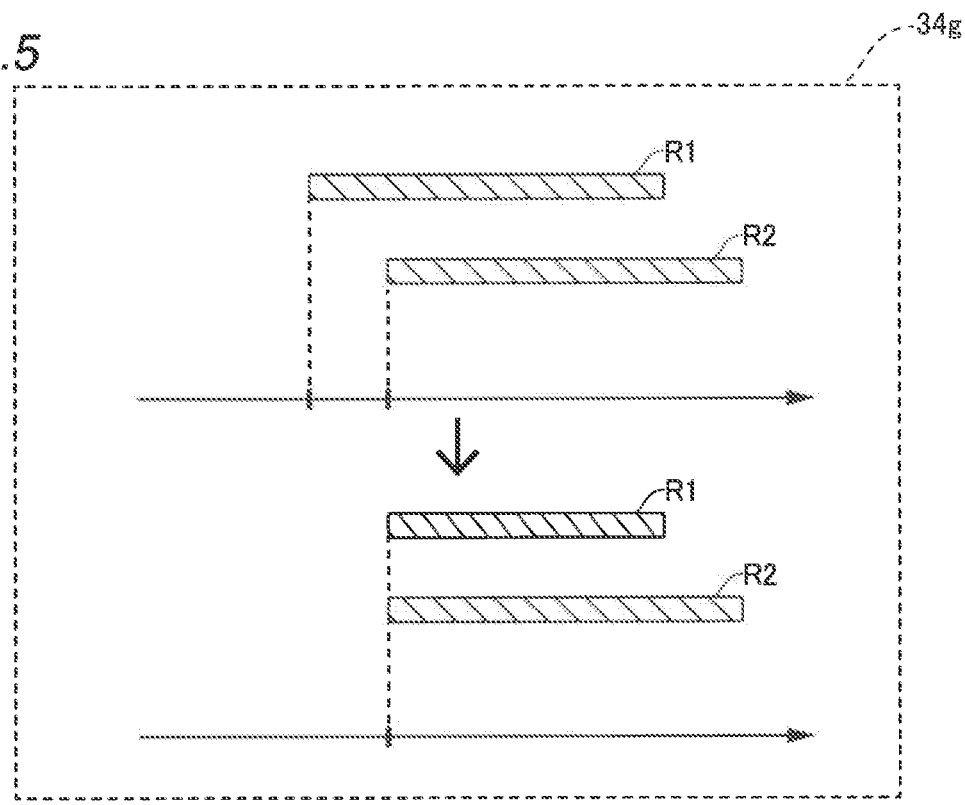
FIG. 5 is a diagram for explaining a correction of out-of-synchronization according to the first embodiment.

As shown in FIG. 5, in the first embodiment, the edit processing unit 34g is configured to correct the out-of-synchronization, based on the timing information T, by cutting the video of the time corresponding to the out-of-synchronization from at least one of the recorded captured video R1 and the recorded captured video R2. More specifically, the edit processing unit 34g performs processing of cropping an image based on the acquired difference with respect to the earlier timing of the captured video R1 and the captured video R2.

For example, in a case where the start timing of the captured video R1 is earlier one second than the start timing of the captured video R2, it is measured by the edit processing unit 34g that the magnitude of the out-of-synchronization is one second based on the timing information T. Then, the video from the starting timing of the earlier captured video R1 to the point after one second is cropped. With this, the start timing of the captured video R1 and the start timing of the captured video R2 are corrected so as to be the same timing.

Further, in addition to the alignment of the start timings, the edit processing unit 34g may be configured to correct such that the corrected captured video R1 and the corrected captured video R2 end at the same timing by cropping an image from the time point one second before the end time point of the later captured video R2 to the end time point.

The recording device 3 may be configured such that the recorded captured video R1 and captured video R2 end at the same timing by outputting an end instruction from the recording instruction unit 34c to the first recording unit 34d and the second recording unit 34e at the same timing.

In the first embodiment, the storage processing unit 34h stores the captured video R1 and the captured video R2 in a state in which the out-of-synchronization has been corrected by the edit processing unit 34g in the storage unit 31 in associated with each other. Specifically, the storage processing unit 34h stores the captured video R1 and the captured video R2 in association with each other in a state in which the timing of the starting time of the captured video R1 and that of the captured video R2 are synchronized.

Here, the "in association with each other" means, for example, that in the case of playing the captured video R1 and the captured video R2 stored in the storage unit 31, the information for enabling corresponding captured video R1 and captured video R2 to be distinguishable is stored in the state in which the information is added to the captured video R1 and the captured video R2. For example, it may be configured such that the header information of the captured video R1 and the captured video R2 to be stored includes the information indicating the association.

Further, it may be configured such that the information indicating that the captured video R1 and the captured video R2 are associated with each other is stored in the storage unit 31 separately from the captured video R1 and the captured video R2.

As described above, in the measurement recording system 100 according to the first embodiment, it is configured such that, by measuring the timing information T indicating the time by the timer unit 34f, the out-of-synchronization of the time axis due to the difference in the delay of the control processing of the first recording unit 34d and the second recording unit 34e based on recording instructions is corrected.

(Control Processing for Measurement Recording Method by Recording Device)

Figure 6:
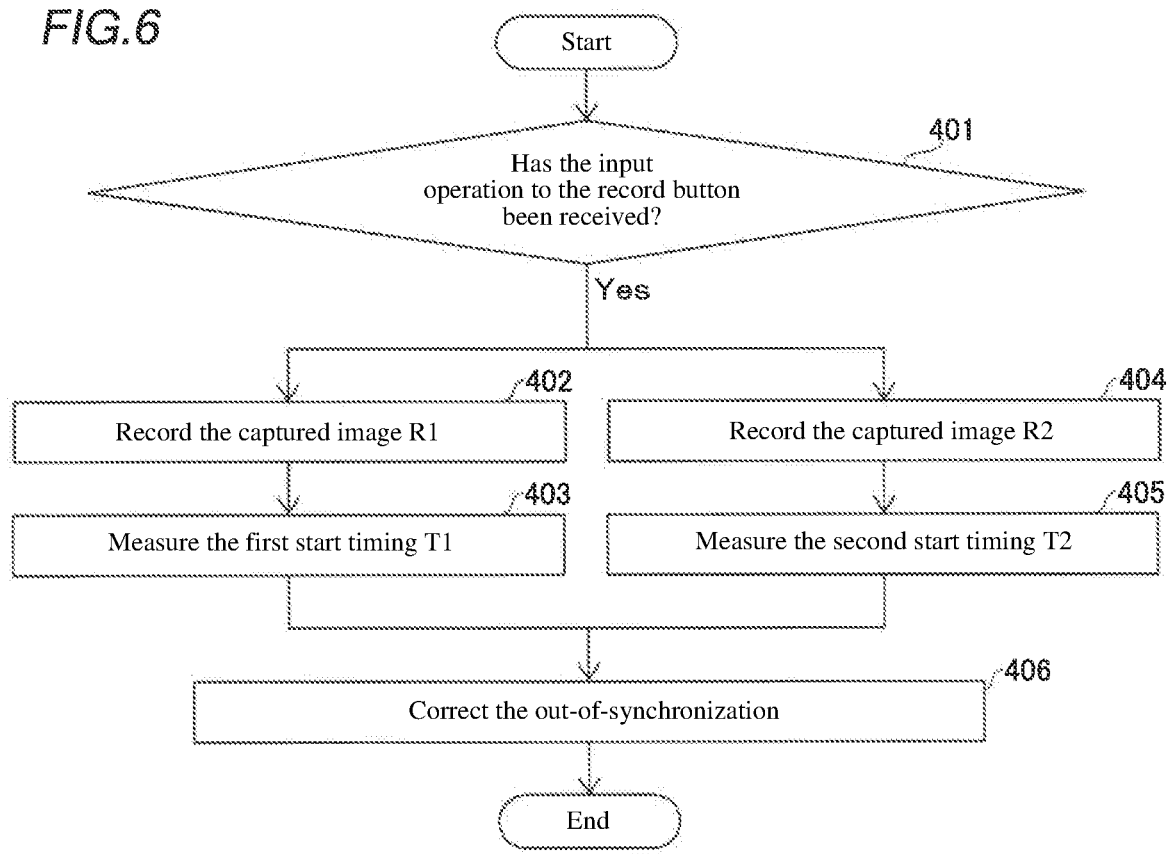
FIG. 6 is a diagram (flowchart) for explaining a measurement recording method according to the first embodiment.

Next, referring to FIG. 6, the control processing flow relating to a measurement recording method according to the first embodiment will be described. Note that the control processing relating to the measurement recording method by the first embodiment is performed by the control unit 34 of the recording device 3.

First, in Step 401, it is determined whether or not an input operation of the record button 33a of the touch panel 33 has been received. In a case where it is determined such that an input operation to the record button 33a of the touch panel 33 has been accepted, a recording instruction is output to the first recording unit 34d and the second recording unit 34e from the recording instruction unit 34c. Then, the process proceeds to Step 402 and Step 404.

In Step 402, the recording instruction is acquired and the captured video R1 is recorded based on the video information E1 captured by the imaging unit 1. Specifically, the captured video R1 is recorded based on the video information E1 acquired by imaging the measuring instrument-side display unit 111 displaying the measurement information about the inspection target 102 measured by the measuring instrument 110. Further, at the timing at which the recording of the captured video R1 is started, first preparation completion information S1 is output.

Next, in Step 403, the timing information T for correcting the out-of-synchronization of the time axis between the captured video R1 to be recorded and the captured video R2 to be recorded is acquired. Specifically, a first start timing T1 is measured based on the first preparation completion information S1. Then, the process proceeds to Step 406.

In Step 404, a recording instruction is acquired, and the captured video R2 is recorded based on the video information E2 captured by the imaging unit 2. Specifically, the captured video R2 is recorded based on the video information E2 acquired by imaging the inspection target 102 in a state of being inspected by the inspection operator 101. At the timing at which recording of the captured video R2 is started, the second preparation completion information S2 is output.

Next, in Step 405, timing information T for correcting the out-of-synchronization of the time axis between the captured video R1 to be recorded and the captured video R2 to be recorded is measured. Specifically, the second start timing T2 is measured based on the second preparation completion information S2. The process then proceeds to Step 406.

In Step 406, the out-of-synchronization is corrected so as to align the start timing of the captured video R1 and that of the captured video R2 based on the measured timing information T. Specifically, the magnitude of the out-of-synchronization is measured based on the difference between the first start timing T1 and the second start timing T2. Then, the out-of-synchronization between the captured video R1 and the captured video R2 is corrected by cutting out the video corresponding to the size of the out-of-synchronization from one of the captured video R1 and the captured video R2 earlier in the start timing based on the measured size of the out-of-synchronization.

Effects of First Embodiment

In this first embodiment, the following effects can be acquired.

The measurement recording system 100 of the first embodiment, as described above, measures the timing information T for correcting the out-of-synchronization of the time axis between the captured video R1 (the first captured video) to be recorded and the captured video R2 (the second captured video) to be recorded.

With this, it is possible to measure the magnitude of the out-of-synchronization of the time axis between the captured video R1 to be recorded and the captured video R2 to be recorded, based on the measured timing information T. Therefore, based on the magnitude of the out-of-synchronization of the time axis between the captured video R1 and the captured video R2, it is possible to correct the image to eliminate the out-of-synchronization. Consequently, when recording a plurality of videos captured by a plurality of different imaging units (the imaging unit 1 and the imaging unit 2), it is possible to record the videos so as to play them with the timings aligned.

Further, by the recording device 3, the timing information T for correcting the out-of-synchronization of the time axis between the captured video R1 to be recorded and the captured video R2 to be recorded is measured. Therefore, even in a case where a plurality of imaging units (the imaging unit 1 and the imaging unit 2) do not have a time code function for giving a time axis to the captured image, the out-of-synchronization of the videos to be recorded can be easily corrected by measuring the timing information T by the recording device 3. As a result, the videos can be easily recorded such that the videos can be played with the timings aligned.

Further, recording can be performed so as to align the timings without using a time code function. Therefore, it is unnecessary to perform the synchronization of the time axis between a plurality of imaging units (the imaging unit 1 and the imaging unit 2) in advance in order to use a time code function, and it is possible to reduce the workload required for recording such that the videos can be played with the timings aligned.

Further, in the first embodiment, further effects can be acquired by the following configuration.

That is, in the first embodiment, the video information E1 (the first video information) includes the measuring instrument video information acquired by imaging the measuring instrument-side display unit 111 displaying the measurement information relating to the inspection target 102 measured by the measuring instrument 110. The video information E2 (the second video information) contains the inspection target video information acquired by the imaging inspection target 102 in a state of being inspected by the inspection operator 101. The recording device 3 is configured to correct the out-of-synchronization such that the start timing of the captured video R1 (the first captured video) to be recorded and the captured video R2 (the second captured video) to be recorded based on the captured video R1 (the first captured image) and the video information E2 (the inspection target video information) is corrected such the start timings of the videos are aligned.

With this configuration, the out-of-synchronization between the captured video R1 to be recorded based on the video information E1 and the captured video R2 to be recorded based on the video information E2 is corrected. Therefore, it is possible to correct the out-of-synchronization of the time axis of between the image of the measuring instrument-side display unit 111 included in the captured video R1 and the image of the inspection target 102 included in the captured video R2. Therefore, it is possible to correct the out-of-synchronization between the image captured by the imaging inspection target 102 in a state of being inspected by the inspection operator 101 and the image captured the display of the measuring instrument-side display unit 111 on which the measurement information relating to the inspection target 102 measured by the measuring instrument 110 is displayed.

With this, the captured video R1 and the captured video R2 can be corrected so that the timing at which the inspection operator 101 performs the inspection on the inspection target 102 and the timing at which the measurement information of the measuring instrument 110 by the inspection of the inspection operator 101 is displayed are synchronized with each other. As a result, the out-of-synchronization between the state of the inspection by the inspection operator 101 and the acquired measurement information is corrected. Therefore, the state of the inspection by the inspection operator 101 and the measurement information acquired by the inspection by the inspection operator 101 can be recorded with the timings aligned.

Further, when inspecting the inspection target 102, the inspection target 102 is inspected while moving the inspection terminal (the measuring probe 112) of the measuring instrument 110 or the like in order to perform a wide range of inspection. Therefore, in a case where the image captured by imaging the inspection target 102 which is being inspected is out of synchronous with the image captured by imaging the display of the measuring instrument-side display unit 111 on which the measurement information is displayed, it is difficult to confirm the correct position of the inspection target 102 corresponding to the displayed measurement information.

In the first embodiment, on the other hand, the recording device 3 is configured to correct the out-of-synchronization such that the start timing between the captured video R1 (the first captured video) to be recorded based on the video information E1 (measuring instrument video information) and the captured video R2 (the second captured video) to be recorded based on the video information E2 (the inspection target video information) is aligned.

With this configuration, the out-of-synchronization between the captured video R1 to be recorded based on the image captured by imaging the measuring instrument-side display unit 111 on which the measurement information is displayed and the captured video R2 to be recorded based on the image captured by imaging the inspection target 102 which is being inspected is corrected. Therefore, the captured video R1 and the captured video R2 can be recorded so that they can be played at the same timing. Therefore, even in the case of performing a wide range of inspection, the inspection target 102 corresponding to the measurement information can be confirmed with high accuracy.

In the first embodiment, the imaging unit 1 (the first imaging unit) is disposed at a position spaced apart from the inspection operator 101, and the imaging unit 2 (the second imaging unit) is configured to be portable or wearable to the inspection operator 101.

With this configuration, even in a case where the instrument-side display unit 111 that displays the measurement information is disposed at a position spaced apart from the inspection operator 101, it is possible to image the measurement information displayed on the measuring instrument-side display unit 111 of the measuring instrument 110 by the imaging unit 1 installed at a position spaced apart from the inspection operator 101. Therefore, even in a case where the measuring instrument 110 and the inspection target 102 are disposed at the separated positions, the video reflecting the inspection target 102 which is being inspected by the inspection operator 101 and the video reflecting the imaging measurement information can be recorded so as to be able to be played with the timings aligned by correcting the out-of-synchronization.

Further, since the imaging unit 2 is configured to be portable or wearable to the inspection operator 101, even in a case where the inspection target 102 is inspected while the inspection operator 101 is moving, the video information E2 (the inspection target video information) can be acquired without moving the imaging unit 2 in accordance with the movement of the inspection operator 101. Therefore, it is possible to suppress the inspection operator 101 from being burdened with the operation for moving the imaging unit 2 in accordance with the movement of the inspection operator 101.

Further, in the first embodiment, the recording device 3 is configured to correct the out-of-synchronization to align the start timing of the captured video R1 (the first captured video) and that of the captured video R2 (the second captured video) and store the captured video R1 and the captured video R2 in association with each other with the out-of-synchronization corrected.

With this configuration, since the captured video R1 and the captured video R2 in which the out-of-synchronization has been corrected to align the start timing can be stored in association with each other, both the video captured by the imaging unit 1 and the video captured by the imaging unit 2 can be easily played simultaneously with the timings aligned. Therefore, it is possible to easily compare two different images captured at the same timing with the time axis aligned.

Further, since the captured video R1 and the captured video R2 are stored in the corrected state, when playing the stored captured video R1 and captured video R2, the videos can be played with the timings aligned without performing the control processing for correcting the out-of-synchronization. Therefore, when playing the stored captured video R1 and the stored captured video R2 with the timings aligned, it is possible to suppress the processing load caused by performing the control processing for correcting the out-of-synchronization.

Further, in the first embodiment, the recording device 3 includes the timer unit 34f for measuring the timing information T indicative of time by measuring the elapsed time, and is configured to correct the out-of-synchronization based on the timing information T measured by the timer unit 34f.

With this configuration, since the elapsed time can be measured by the timer unit 34f, the timing information T indicating the time can be easily measured. Therefore, it is possible to easily obtain the specific magnitude (the length of time) of the out-of-synchronization between the captured video R1 (the first captured video) and the captured video R2 (the second captured video) based on the timing information T measured by the timer unit 34f. Consequently, since the out-of-synchronization can be easily corrected based on the timing information T measured by the timer unit 34f, it is possible to easily record the captured video R1 and the captured video R2 so that the videos can be played with the timings aligned.

In the first embodiment, the first recording unit 34d and the second recording unit 34e are configured to start recording the captured video R1 (the first captured video) and the captured video R2 (the second captured video) based on the recording instruction for causing the first recording unit 34d and the second recording unit 34e to start recording. The recording device 3 is configured to correct the out-of-synchronization of the time axis between the captured video R1 recorded based on the recording instruction and the captured video R2 recorded based on the recording instruction.

Here, there is a case in which the time required for the control processing for the first recording unit 34d to record the captured video R1 based on the recording instruction may differ from the time required for the control processing for the second recording unit 34e to record the captured video R2 based on the recording instruction. In this case, since there is a difference between the timing at which the recording of the captured video R1 is started and the timing at which the recording of the captured video R2 is started, there is the out-of-synchronization between the recorded captured video R1 and the recorded captured video R2.

In contrast, in the first embodiment, the recording device 3 is configured to correct the out-of-synchronization of the time axis between the captured video R1 recorded based on the recording instruction and the captured video R2 recorded based on the recording instruction. With this configuration, even in a case where there is out-of-synchronization between the captured video R1 recorded based on the recording instruction and the captured video R2 recorded based on the recording instruction, the out-of-synchronization of the time axis can be corrected. Therefore, even in a case where there is a difference in the time required for the control processing for starting the recording based on the recording instruction, the out-of-synchronization can be easily corrected by the recording device 3. Therefore, the captured video R1 and the captured video R2 can be easily recorded such that the videos can be played with the timings aligned.

Further, in the first embodiment, the timing information T includes the first start timing T1 indicating the timing at which the first recording unit 34d starts recording and the second start timing T2 indicating the timing at which the second recording unit 34e starts recording. The recording device 3 is configured to correct the out-of-synchronization based on the difference between the first start timing T1 and the second start timing T2.

With this configuration, since the first start timing T1 and the second start timing T2 can be measured by the timer unit 34f, the specific magnitude of the out-of-synchronization between the captured video R1 and the captured video R2 can be easily measured, based on the difference between the first start timing T1 and the second start timing T2 measured by the timer unit 34f. Therefore, based on the timing information T measured by the timer unit 34f, it is possible to easily measure the specific magnitude of the out-of-synchronization between the captured video R1 and the captured video R2. As a result, based on the measured magnitude of the out-of-synchronization, the captured video R1 and the captured video R2 can be easily recorded such that the videos can be played with the timings aligned.

Further, in the first embodiment, the touch panel 33 (recording operation unit) for accepting an operation for causing the first recording unit 34d and the second recording unit 34e to start recording is further provided. The recording device 3 is configured to output the recording instruction based on the input operation to the touch panel 33 and correct the out-of-synchronization of the time axis between the captured video R1 (the first captured video) recorded based on recording the instruction and the captured video R2 (the second captured video) recorded based on the recording instruction.

With this configuration, the inspection operator 101 can easily start recording the first recording unit 34d and the second recording unit 34e by operating the touch panel 33. Therefore, the recording can be easily started by operating the touch panel 33, and the captured video R1 to be recorded and the captured video R2 to be recorded can be easily recorded such that the videos can be played with the timings aligned.

In the first embodiment, the recording device 3 is configured to correct the out-of-synchronization by cropping the video of the time corresponding to the out-of-synchronization from at least one of the recorded captured video R1 (the first captured video) and the recorded captured video R2 (the second captured video), based on the timing information T measured by the timer unit 34f.

Here, in a case where the out-of-synchronization is corrected by inserting a blank image for the time corresponding to the time corresponding to the out-of-synchronization into the image of one of the captured video R1 and the captured video R2 later in the recording timing, the load of the control processing increases as compared with the case in which the out-of-synchronization is corrected by cropping the image.

Further, in a case in which the out-of-synchronization is corrected by inserting a blank image, the blank image is inserted at the starting point of the corrected image. Therefore, when visually recognizing the recorded content, it is required to wait for the time corresponding to the blank image. On the other hand, in the first embodiment, it is configured to correct the out-of-synchronization by cropping the video for the time corresponding to the out-of-synchronization from at least one of the recorded captured video R1 and the recorded captured video R2.

With this configuration, unlike the case in which the out-of-synchronization is corrected by inserting the blank image, it is possible to suppress the increase in the load of the control processing. Further, since the video captured from the starting point of the corrected video can be visually recognized, it is possible to reduce the workload of the inspection operator 101 by waiting for the time of the blank video.

Further, in the first embodiment, the timing information T includes: the first preparation completion information S1 output from the first recording unit 34d and indicating that the preparation for starting recording the captured video R1 (the first captured video) has been completed; and the second preparation completion information S2 output from the second recording unit 34e and indicating that preparation for starting recording the captured video R2 (the second captured video) has been completed. The recording device 3 is configured to correct the out-of-synchronization based on the first preparation completion information S1 and the second preparation completion information S2.

With this configuration, based on the first preparation completion information S1 and the second preparation completion information S2 from the first recording unit 34d and the second recording unit 34e, respectively, it is possible to easily measure the timing at which the control processing for preparing the recording by the first recording unit 34d is completed and the timing at which the control processing for preparing the recording by the second recording unit 34e is completed.

Therefore, even in a case where there is a difference between the time required for the control processing in the first recording unit 34d and the time required for the control processing in the second recording unit 34e, based on the first preparation completion information S1 from the first recording unit 34d and the second preparation completion information S2 from the second recording unit 34e, it is possible to easily measure the difference between the time required for the control processing by the first recording unit 34d and the time required for the control processing by the second recording unit 34e. As a result, the out-of-synchronization of the time axis between the captured video R1 and the captured video R2 can be more easily corrected based on the first preparation completion information S1 and the second preparation completion information S2. Therefore, the captured video R1 and the captured video R2 can be recorded more easily such that the videos can be played with the timings aligned.

Further, in the first embodiment, the first recording unit 34d is configured to output the first preparation completion information S1 and start recording the captured video R1 (the first captured video), and the second recording unit 34e is configured to output the second preparation completion information S2 and start recording the captured video R2 (the second captured video). The recording device 3 is configured to correct the out-of-synchronization based on the difference between the timing at which the first preparation completion information S1 is acquired and the timing at which the second preparation completion information S2 is acquired, based on the first preparation completion information S1 and the second preparation completion information S2.

With this configuration, by measuring the first preparation completion information S1 under the control of the first recording unit 34d, the timing at which the recording of the captured video R1 is started can be measured. Further, by measuring the second preparation completion information S2 under the control of the second recording unit 34e, the timing at which the recording of the captured video R2 is started can be measured.

For this reason, without newly providing a configuration for measuring the timing at which the recording of the captured video R1 is started and the timing at which the recording of the captured video R2 is started, the timings at which the captured video R1 and the captured video R2 are started can be easily measured by measuring the first preparation completion information S1 and the second preparation completion information S2 based on the control by the first recording unit 34d and the second recording unit 34e. As a result, the out-of-synchronization can be easily corrected by measuring the first preparation completion information S1 from the first recording unit 34d and the second preparation completion information S2 from the second recording unit 34e. Therefore, the captured video R1 and the captured video R2 can be easily recorded such that the videos can be played with the timings aligned.

Effects of Measurement Recording Method of First Embodiment

In the measurement recording method of the first embodiment, the following effects can be acquired.

In the measurement recording method of the first embodiment, as described above, the timing information T for correcting the out-of-synchronization of the time axis between the captured video R1 (the first captured video) to be recorded and the captured video R2 (the second captured video) to be recorded is measured. With this, it is possible to measure the magnitude of the out-of-synchronization of the time axis between the captured video R1 to be recorded and the captured video R2 to be recorded, based on the measured timing information T.

Therefore, based on the magnitude of the out-of-synchronization of the time axis between the captured video R1 and the captured video R2, it is possible to correct the image to eliminate the out-of-synchronization. As a consequence, it is possible to provide a measurement recording method capable of performing recording such that the videos can be played with the timings aligned when recording a plurality of videos captured by a plurality of imaging units (the imaging unit 1 and the imaging unit 2).

Further, the timing information T for correcting the out-of-synchronization of the time axis between the captured video R1 to be recorded and the captured video R2 to be recorded is measured by the recording device 3. Therefore, even in a case where a plurality of imaging units (the imaging unit 1 and the imaging unit 2) does not have a time code function to give the information of the time axis to the captured video, the out-of-synchronization of the captured video can be easily corrected by measuring the timing information T by the recording device 3. As a result, the videos can be easily recorded such that the videos can be played with the timings aligned.

Further, the recording can be performed such that the videos can be played with the timings aligned without using a time code function. Therefore, it is unnecessary to synchronize the time axis between a plurality of imaging units (the imaging unit 1 and the imaging unit 2) in advance in order to use a time code function, which in turn can reduce the workload required for recording such that the videos can be played with the timings aligned.

Further, in the first embodiment, the step for recording the captured video R1 (the first captured video) is a step for recording the captured video R1, based on the video information E1 (the first video information) including the measuring instrument video information acquired by imaging the measuring instrument-side display unit 111 displaying the measurement information relating to the inspection target 102 measured by the measuring instrument 110. The step for recording the captured video R2 (the second captured video) is a step for recording the captured video R2 based on the video information E2 (the second video information) including the inspection target video information acquired by imaging the inspection target 102 in a state of being inspected by the inspection operator 101.

With this configuration, the out-of-synchronization between the captured video R1 to be recorded based on the video information E1 and the captured video R2 to be recorded based on the video information E2 is corrected. Therefore, the out-of-synchronization of the time axis between the image of the measuring instrument-side display unit 111 included in the captured video R1 and the image of the inspection target 102 included in the captured video R2 can be corrected. Therefore, it is possible to correct the out-of-synchronization between the image captured by imaging the inspection target 102 in a state of being inspected by the inspection operator 101 and the image captured by imaging the display of the measuring instrument-side display unit 111 on which the measurement information relating to the inspection target 102 measured by the measuring instrument 110 is displayed. With this, the captured video R1 and the captured video R2 can be corrected so that the timing at which the inspection operator 101 to perform the inspection on the inspection target 102 and the timing at which the measurement information of the measuring instrument 110 by the inspection of the inspection operator 101 is displayed are synchronized with each other. As a result, the out-of-synchronization between the state of the inspection by the inspection operator 101 and the acquired measurement information is corrected, so that the state of the inspection by the inspection operator 101 and the timing of the measurement information acquired by the inspection by the inspection operator 101 can be recorded with the timings aligned.

In the case of inspecting the inspection target 102, the inspection target 102 is inspected while moving the inspection terminal (the measuring probe 112) of the measuring instrument 110 or the like in order to perform a wide range of the inspection. Therefore, in a case where the image of the imaging inspection target 102 which is being inspected and the image of the display of the measuring instrument-side display unit 111 on which the measurement information is displayed are out of synchronous, it is difficult to confirm the correct position of the inspection target 102 corresponding to the displayed measurement information.

In this regard, in the first embodiment, the recording device 3 is configured to correct the out-of-synchronization to align the start timing of the captured video R1 (the first captured video) recorded based on the video information E1 (the measuring instrument video information) and the captured video R2 (the second captured video) recorded based on the video information E2 (the inspection target video information).

With this configuration, the out-of-synchronization between the captured video R1 to be recorded based on the image of the inspection target 102 which is being inspected and the captured video R2 to be recorded based on the image of the measuring instrument-side display unit 111 on which the measurement information is displayed is corrected. Therefore, the captured video R1 and the captured video R2 can be recorded such that the videos can be played with the timings aligned. Therefore, even in a case of performing a wide range of inspection, the inspection target 102 corresponding to the measurement information can be confirmed with high accuracy.

Second Embodiment

Figure 7:
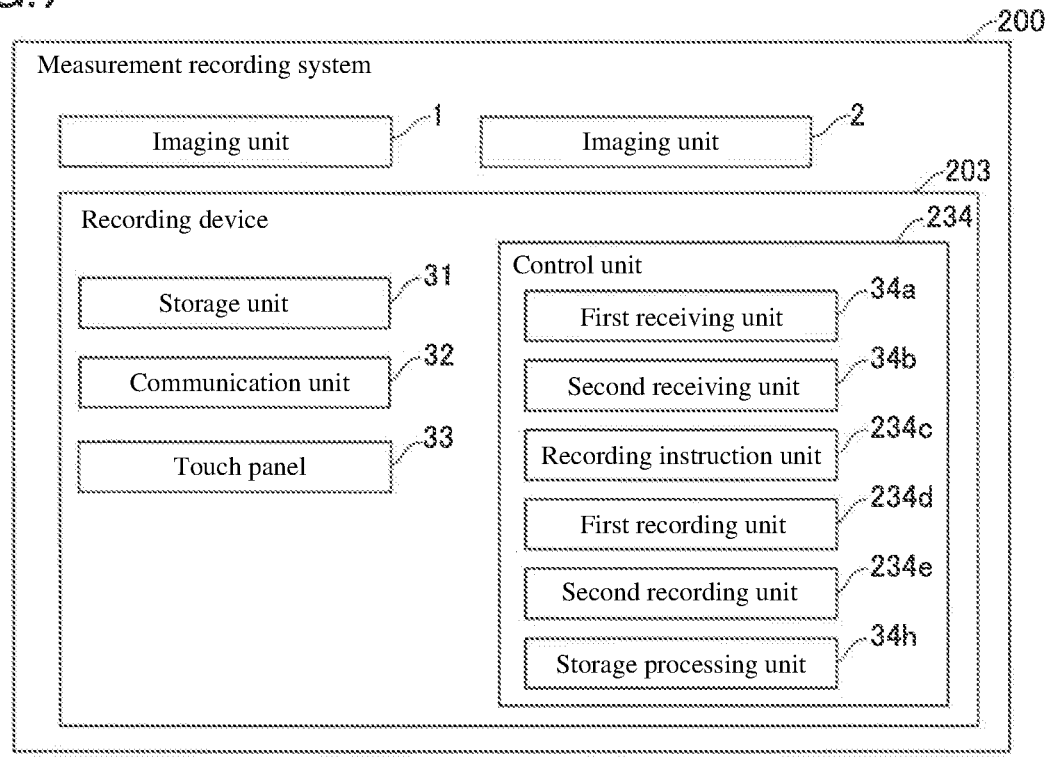
FIG. 7 is a block diagram for explaining an entire configuration of a measurement recording system according to a second embodiment.
Figure 8:
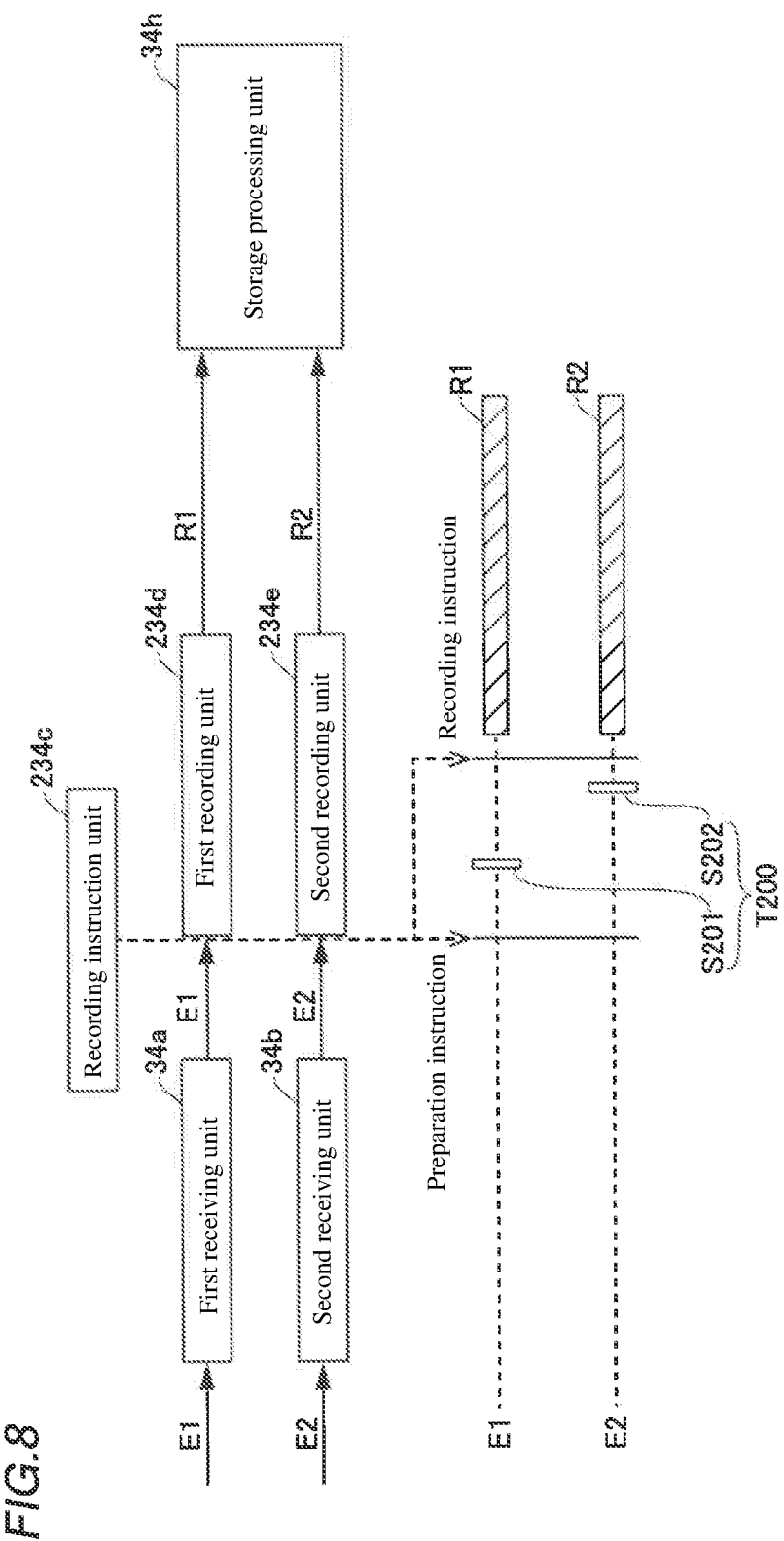
FIG. 8 is a diagram for explaining out-of-synchronization corrections by the second embodiment.

Referring to FIG. 7 and FIG. 8, a configuration of a measurement recording system 200 according to the second embodiment will be described. Unlike the first embodiment configured to start recording based on a recording instruction, the second embodiment is configured to start recording based on the fact that the first preparation completion information S201 and the second preparation completion information S202 are measured.

In the figures, the same component as that of the above-described first embodiment is denoted by the same reference numeral, and the description thereof will be omitted.

Configuration of Measurement Recording System According to Second Embodiment

As shown in FIG. 7, the measurement recording system 200 according to the second embodiment is provided with a recording device 203. The recording device 203 records the captured video R1 and the captured video R2 based on the video information E1 and the video information E2, respectively, in the same manner as in the recording device 3 according to the first embodiment. The recording device 203 corrects the out-of-synchronization to align the start timings of the captured video R1 and the captured video R2.

In the second embodiment, the recording device 203 includes a control unit 234. The control unit 234 includes, as functional components, a recording instruction unit 234c, a first recording unit 234d, and a second recording unit 234e. That is, the control unit 234 functions as the recording instruction unit 234c, the first recording unit 234d, and the second recording unit 234e by executing programs.

As shown in FIG. 8, in the second embodiment, the recording device 203 is configured to correct the out-of-synchronization by measuring the timing information T200 including the first preparation completion information S201 and the second preparation completion information S202 and outputting a recording instruction for starting recording to the first recording unit 234d and the second recording unit 234e based on the measured timing information T200.

The recording instruction unit 234c outputs a preparation instruction for making the first recording unit 234d and the second recording unit 234e prepare to start recording. Specifically, the recording instruction unit 234c outputs a preparation instruction for making the first recording unit 234d and the second recording unit 234e prepare to start recording, based on the input operation of the touch panel 33 to the record button 33a by the inspection operator 101.

The first recording unit 234d prepares for recording the captured video R1 based on the preparation instruction from the recording instruction unit 234c. Specifically, the first recording unit 234d performs control processing so as to become a state in which the recording can be started (preparation completed state), based on the acquisition of the preparation instruction. When the preparation for recording has been completed, the first recording unit 234d outputs a first preparation completion information S201 indicating the completion of preparation for starting recording the captured video R1 to the recording instruction unit 234c.

Similarly, the second recording unit 234e prepares for recording the captured video R2 based on the preparation instruction from the recording instruction unit 234c. When the preparation for recording has been completed, the second recording unit 234e outputs a second preparation completion information S202 indicating the completion of preparation for starting the recording of the captured video R2 to the recording instruction unit 234c.

The recording instruction unit 234c measures that the timing information T200 (the first preparation completion information S201 and the second preparation completion information S202) indicating that preparations for starting recording are completed from the first recording unit 234d and the second recording unit 234e has been output. The recording instruction unit 234c outputs a recording instruction for causing the first recording unit 234d and the second recording unit 234e to start recording, based on the timing information T200.

That is, unlike the first embodiment in which the timing information T is information indicating the time (timing) at which recording is started, in the second embodiment, the timing information T200 is information (the first preparation completion information S201 and the second preparation completion information S202) indicating that preparations for starting recording are completed.

As described above, the recording device 203 starts recording the captured video R1 and the captured video R2 at the same timing without delay, by outputting a recording instruction to the first recording unit 234d and the second recording unit 234e in a recording preparation completion state. That is, the measurement recording system 200 according to the second embodiment is configured to start recording both the captured video R1 and the captured video R2 at the same timing without delay by measuring the timing information T200 indicating the timing for starting recording to thereby correct the out-of-synchronization of the time axis.

The rest of the configuration of the second embodiment is the same as that of the first embodiment.

Effects of Second Embodiment

In this second embodiment, the following effects can be acquired.

In the second embodiment, the recording device 203 is configured to correct the out-of-synchronization by measuring the timing information T200 including the first preparation completion information S201 and the second preparation completion information S202 and outputting a recording instruction for starting recording to the first recording unit 234d and the second recording unit 234e based on that the timing information T200 has been measured.

Here, in a case where the types (models) of the imaging unit 1 and the imaging unit 2, or the communication modes (wired or radio) of the video information E1 and the video information E2 are different, the time required for the control processing from the time when the recording instruction for starting recording is acquired to the time when the preparation for recording has been completed is different between the first recording unit 234d and the second recording unit 234e.

On the other hand, in the second embodiment, the recording device 203 is configured to correct the out-of-synchronization by measuring the timing information T200 including the first preparation completion information S201 and the second preparation completion information S202 and outputting a recording instruction for starting recording to the first recording unit 234d and the second recording unit 234e based on the fact that the timing information T200 has been measured.

With this configuration, even in a case where the types (model types) of the imaging unit 1 and the imaging unit 2 or the communication modes of the video information E1 and the video information E2 differ from each other, a recording instruction for starting recording can be output in a state in which the preparation for recording has been completed in both the first recording unit 234d and the second recording unit 234e, based on the fact that the timing information T200 has been measured.

Therefore, it is possible to suppress the deviation between the recording start timing of the first recording unit 234d and that of the second recording unit 234e due to the fact that the time required for the recording preparation control processing differs between the first recording unit 234d and the second recording unit 234e. As a result, even in a case where the time required for the recording preparation control processing differs between the first recording unit 234d and the second recording unit 234e, the captured video R1 and the captured video R2 can be recorded such that the videos can be played with the timings aligned.

The other effects of the second embodiment are the same as those of the above-described first embodiment.

Third Embodiment

Figure 9:
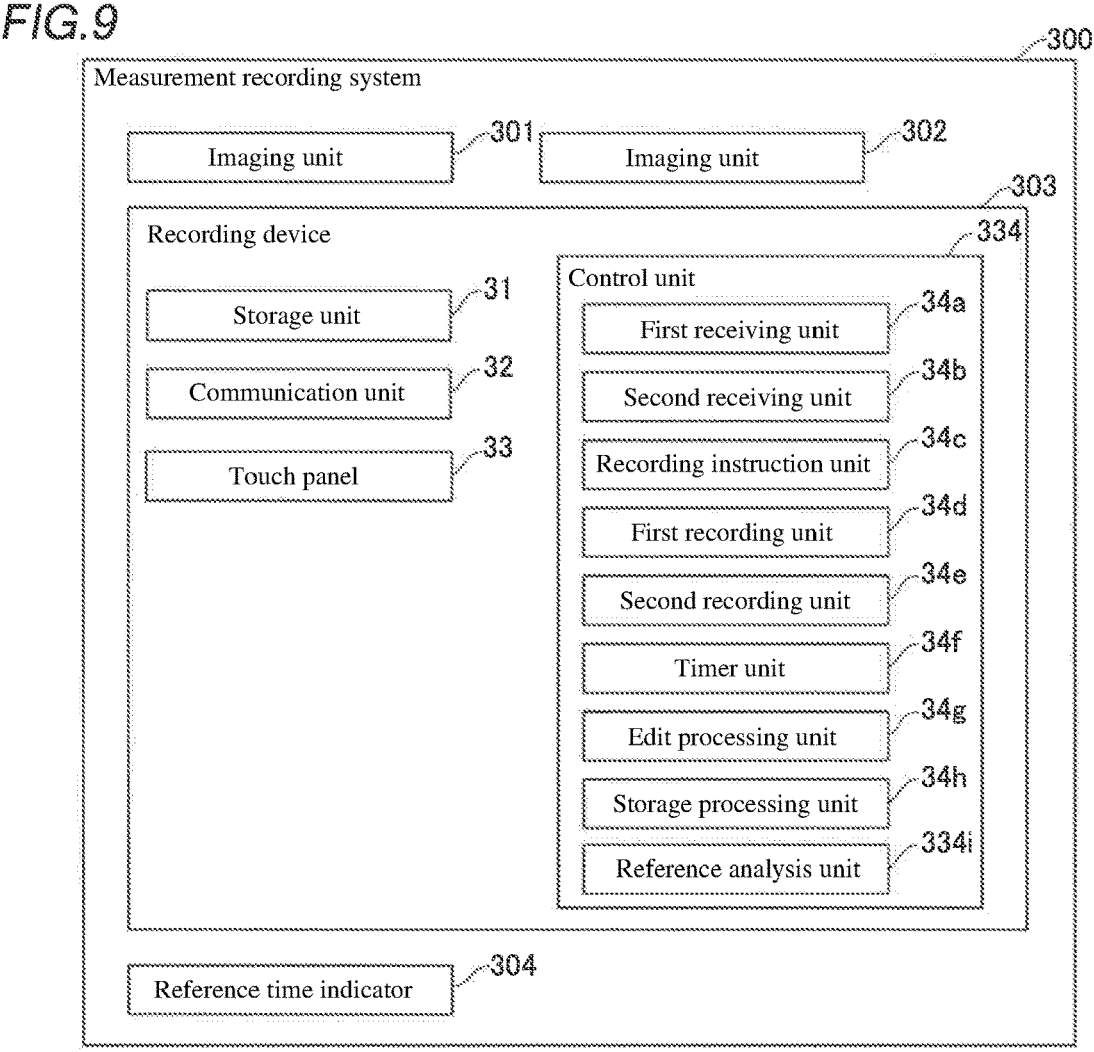
FIG. 9 is a block diagram for explaining an entire configuration of the measurement recording system according to a third embodiment.
Figure 10:
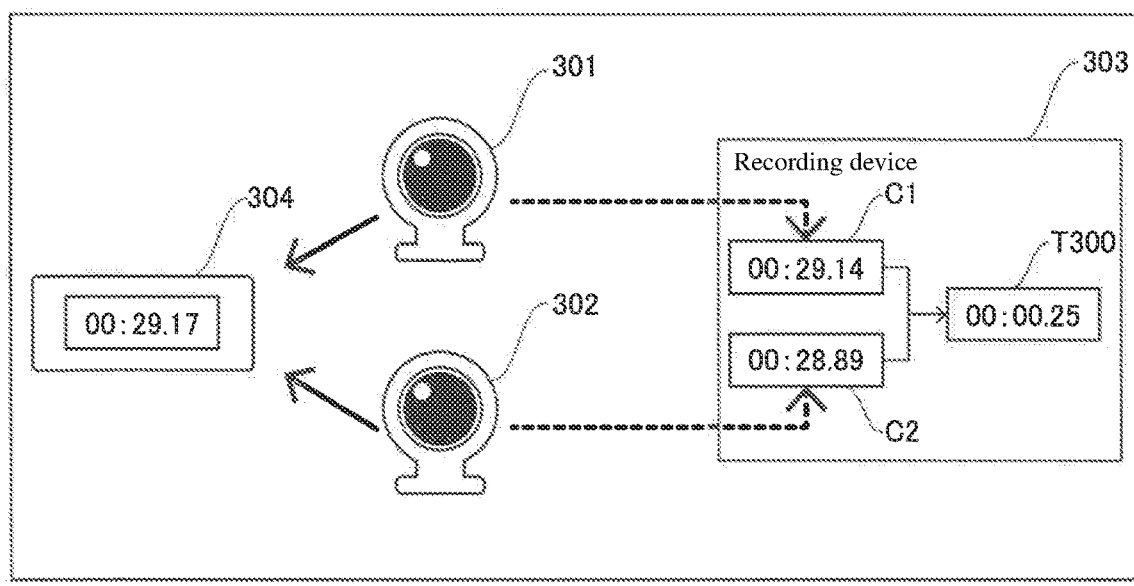
FIG. 10 is a diagram for explaining a correction of out-of-synchronization according to the third embodiment.

Referring to FIG. 9 and FIG. 10, a configuration of a measurement recording system 300 according to a third embodiment will be described. Unlike the first recording unit 34d and the second recording unit 34e configured to correct the out-of-synchronization due to the difference in the delay of the control processing, in the third embodiment, it is configured to correct the out-of-synchronization due to the difference in the delay of the signal from the imaging unit 301 and the imaging unit 302. Note that in the figures, the same component as that of the above-described first embodiment is denoted by the same reference numeral, and the description thereof will be omitted.

Configuration of Measurement Recording System of Third Embodiment

As shown in FIG. 9, the measurement recording system 300 according to the third embodiment is provided with an imaging unit 301, an imaging unit 302, a recording device 303, and a reference time indicator 304. The imaging unit 301 is an example of the "first imaging unit" recited in claims. The imaging unit 302 is an example of the "second imaging unit" recited in claims. The reference time indicator 304 is an example of the "reference target" recited in claims.

Like the measurement recording system 100 according to the first embodiment, the measurement recording system 300 according to the third embodiment is configured to correct the out-of-synchronization of the time axis due to the difference in the delay of the control processing of the first recording unit 34d and the second recording unit 34e based on the recording instruction by measuring the timing information T indicating the time by the timer unit 34f.

That is, in the same manner as the imaging unit 1 according to the first embodiment, the imaging unit 301 transmits the video information E1. Further, similarly to the imaging unit 2 by the first embodiment, the imaging unit 302 transmits the video information E2.

Further, similarly to the recording device 3 according to the first embodiment, the recording device 303 records the captured video R1 and the captured video R2 by the first recording unit 34d and the second recording unit 34e based on the video information E1 and the video information E2. Then, the recording device 303 corrects the out-of-synchronization of the time axis between the captured video R1 and the captured video R2 by the edit processing unit 34g. Then, the recording device 303 is configured to store the captured video R1 and the captured video R2 in association with each other by the storage processing unit 34h with the out-of-synchronization corrected.

In the measurement recording system 300 according to the third embodiment, in addition to the correction of the out-of-synchronization due to the difference in the delay of the control processing of the first recording unit 34d and the second recording unit 34e, it is configured to correct the deviation of the time axis of the video information E1 and the video information E2 from each of the imaging unit 301 and the imaging unit 302.

Specifically, as shown in FIG. 10, in the third embodiment, the imaging unit 301 and the imaging unit 302 image the reference time indicator 304 capable of acquiring the time information at the same timing in order to correct the deviation of the time axis between the video information E1 from the imaging unit 301 and the video information E2 from the imaging unit 302. The imaging unit 301 and the imaging unit 302 transmit the video information E1 including the reference image C1 of the reference time indicator 304 and the video information E2 including the reference image C2 to the recording device 303, in order to correct the deviation of the time axis between the video information E1 and the video information E2.

Note that the reference image C1 is an example of the "first reference image" recited in claims. The reference image C2 is an example of the "second reference image" recited in claims.

Further, in the third embodiment, the recording device 303 is configured to measure the timing information T300 indicating the deviation of the time axis between the video information E1 and the video information E2, based on the reference image C1 reflecting the reference time indicator 304 captured the imaging unit 301 and the reference image C2 reflecting the reference time indicator 304 captured the imaging unit 302 and correct the out-of-synchronization, based on the measured timing information T300.

In the third embodiment, the reference time indicator 304 is configured to be able to acquire time information in order to correct the deviation of the time axis between the video information E1 and the video information E2. Specifically, the reference time indicator 304 displays a reference time. The reference time indicator 304 is, for example, a stopwatch or a digitally displaying watch.

<Configuration of Control Unit of Recording Device>

As shown in FIG. 9, the recording device 303 includes a control unit 334. The control unit 334 includes a reference analysis unit 334i as a functional configuration. That is, the control unit 334 functions as the reference analysis unit 334i by executing a program.

The reference analysis unit 334i is configured to correct the deviation of the time axis between the video information E1 from the imaging unit 301 and the video information E2 from the imaging unit 302 when the recording device 303 is activated, for example. Note that the reference analysis unit 334i may be configured to perform control for correcting the deviation of the time axis between the video information E1 and the video information E2, based on the input operation to the touch panel 33 by the inspection operator 101.

The reference analysis unit 334i acquires the reference image C1 and the reference image C2, based on the video information E1 and the video information E2 from the imaging unit 301 and the imaging unit 302. Specifically, the imaging unit 301 and the imaging unit 302 are disposed by the inspection operator 101 so that the reference time indicator 304 can be imaged at the same timing. The reference analysis unit 334i acquires the reference image C1 and the reference image C2 at the same timing from the video information E1 acquired via the first receiving unit 34a and the video information E2 acquired via the second receiving unit 34b. The reference analysis unit 334i acquires the reference image C1 and the reference image C2 as still images from the video information E1 and the video information E2 which are continuously acquired at the same timing.

The reference analysis unit 334i performs image processing on the acquired reference image C1 and reference image C2. The reference analysis unit 334i acquires the times displayed by the reference time indicator 304 captured by the imaging unit 301 and the imaging unit 302 from the images of the reference time indicator 304 included in the reference image C1 and the reference image C2 by, for example, an optical character recognition (OCR: Optical character recognition). Then, the reference analysis unit 334i acquires the difference between the times acquired from each of the reference image C1 and the reference image C2 as the timing information T300 to thereby measure the deviation of the time axis between the timing at which the video information E1 of the reference image C1 is captured and the timing at which the video information E2 of the reference image C2 is captured.

For example, as shown in FIG. 10, at the timing at which the reference time indicator 304 displays "00:29.17", the reference analysis unit 334i acquires the reference image C1 and the reference image C2 from the video information E1 and the video information E2 received by the first receiving unit 34a and the second receiving unit 34b. Then, the reference analysis unit 334i performs image processing on the acquired reference image C1 to acquire "00:29.14" as the timing at which the reference image C1 was imaged as the time information of the reference image C1. Similarly, the reference analysis unit 334i performs image processing on the acquired reference image C2 to acquire "00:28.89" as the timing at which the reference image C2 was imaged as the time information of the reference image C1. The reference analysis unit 334i acquires "00:00.25" as the timing information T300 (correction value) indicating the deviation of the time axis between the reference image C1 and the reference image C2, based on the results of the image processing of the reference image C1 and the reference image C2. That is, the reference analysis unit 334i measures "00:00.25" as the deviation of the time axis between the video information E1 from the imaging unit 301 and the video information E2 from the imaging unit 302.

In the third embodiment, the recording device 303 corrects the captured video R1 and the captured video R2 to suppress the occurrence of the out-of-synchronization of the time axis between the video information E1 from the imaging unit 301 and the video information E2 from the imaging unit 302 by correcting the deviation of the time axis between the video information E1 from the imaging unit 301 and the video information E2 from the imaging unit 302, based on the timing information T300 acquired by the reference analysis unit 334i.

For example, the recording device 303 corrects the timing at which the first recording unit 34d or the second recording unit 34e starts recording, based on the acquired correction value (the timing information T300). The recording device 303 may be configured to correct the timing at which the first receiving unit 34a or the second receiving unit 34b acquires the video information E1 or the video information E2, based on the acquired correction value (the timing information T300). Further, the recording device 303 may be configured to cause the edit processing unit 34g to correct the out-of-synchronization of the captured video R1 and the captured video R2, based on the acquired correction value (the timing information T300).

The rest of the configuration of the third embodiment is the same as that of the first embodiment.

Effects of Third Embodiment

In the third embodiment, the following effects can be acquired.

In the third embodiment, the imaging unit 301 (the first imaging unit) and the imaging unit 302 (the second imaging unit) are configured to capture the reference time indicator 304 (reference target) from which the time information can be acquired at the same timing in order to correct the deviation of the time axis between the video information E1 (the first video information) from the imaging unit 301 and the video information E2 (the second video information) from the imaging unit 302.

The recording device 303 is configured to measure the timing information T300 indicating the deviation of the time axis between the video information E1 and the video information E2, based on the reference image C1 (the first reference image) reflecting the reference time indicator 304 captured by the imaging unit 301 and the reference image C2 (the second reference image) reflecting the reference time indicator 304 captured by the imaging unit 302 and correct the out-of-synchronization based on the measured timing information T300.

Here, in the imaging unit 301 and the imaging unit 302, due to the difference in the type or the difference in the communication form with respect to the recording device 303, the video information E1 from the imaging unit 301 to be acquired by the recording device 303 and the video information E2 from the imaging unit 302 to be acquired by the recording device 303 may include a deviation of the time axis. In this instance, the captured video R1 (the first captured video) based on the video information E1 and the captured video R2 (the second captured video) based on the video information E2 are recorded with the timings shifted.

On the other hand, in the third embodiment, the recording device 303 is configured to measure the timing information T300 indicating the deviation of the time axis between the video information E1 and the video information E2, based on the reference image C1 in which the imaging unit 301 imaged the reference time indicator 304 and the reference image C2 in which the imaging unit 302 imaged the reference time indicator 304 and correct the out-of-synchronization, based on the measured timing information T300.

With this configuration, by imaging the reference time indicator 304 capable of acquiring the time information, it is possible to easily measure the timing at which the imaging unit 301 captured the reference image C1 and the timing at which the imaging unit 302 captured the reference image C2. Therefore, the timing information T300 indicating the deviation of the time axis between the video information E1 and the video information E2 can be easily measured, based on the reference image C1 and the reference image C2. Therefore, it is possible to easily correct the deviation of the time axis between the video information E1 from the imaging unit 301 and the video information E2 from the imaging unit 302. As a result, even in a case where the video information E1 from the imaging unit 301 and the video information E2 from the imaging unit 302 include a deviation of the time axis, the captured video R1 and the captured video R2 can be recorded such that the videos can be played with the timings aligned.

In the third embodiment, the reference target includes the reference time indicator 304 for displaying the reference time for correcting the deviation of the time axis between the video information E1 (the first video information) from the imaging unit 301 (the first imaging unit) and the video information E2 (second video information) from the imaging unit 302 (the second imaging unit).

The recording device 303 is configured such that the imaging unit 301 captures the reference image C1 (the first reference image) in which the imaging unit 301 imaged the reference time indicator 304 and the reference image C2 (the second reference image) in which the imaging unit 302 imaged the reference time indicator 304 and performs image processing on the acquired reference image C1 and reference image C2, thereby measuring the deviation of the time axis between the timing captured by the video information E1 and the timing captured by the video information E2.

With this configuration, by imaging the reference time indicator 304 displaying the reference time, it is possible to easily measure the timing at which the reference image C1 was captured and the timing at which the reference image C2 was captured.

Further, by performing the image processing on the captured reference image C1 and reference image C2, it is possible to easily measure the difference in the specific time between the timing at which the reference image C2 was captured and the timing at which the reference image C1 was captured. Therefore, since the magnitude of the deviation between the video information E1 acquired by the first receiving unit 34a and the video information E2 acquired by the second receiving unit 34b can be easily measured, based on the measured specific time difference, the out-of-synchronization can be easily corrected based on the measured magnitude of the deviation. As a result, even in a case where the video information E1 from the imaging unit 301 and the video information E2 from the imaging unit 302 include a deviation of the time axis, the captured video R1 and the captured video R2 can be recorded more easily such that the videos can be played with the timings aligned.

The other effects of the third embodiment are the same as those of the above-described first and second embodiments.

Modified Embodiments

It should be understood that the embodiments disclosed here are examples in all respects and are not restrictive. The scope of the present invention is shown by the claims rather than the descriptions of the embodiments described above, and includes all changes (modifications) within the meaning and range equivalent to claims.

For example, in the above-described first to third embodiments, an example is shown in which the first video information is acquired by imaging the measuring instrument-side display unit displaying the measurement information about the inspection target measured by the measuring instrument, and the second video information is acquired by imaging the inspection target in a state of being inspected by the inspection operator, but the present invention is not limited thereto. For example, both the first video information and the second video information may be configured to be acquired by imaging the inspection target in a state of being inspected by the inspection operator. Further, the first video information and the second video information may be acquired by imaging a scene, a person, and the like.

In the above-described first to third embodiments, an example is shown in which the first imaging unit is disposed at a position spaced apart from the inspection operator, and the second imaging unit is configured to be portable or wearable to the inspection operator, but the present invention is not limited thereto. For example, both the first imaging unit and the second imaging unit may be configured to be portable or wearable to the inspection operator. Further, both the first imaging unit and the second imaging unit may be disposed at a position spaced apart from the inspection operator.

Further, in the above-described first to third embodiments, an example is shown in which the recording device corrects the out-of-synchronization to align the start timing between the first captured video and the second captured video and store the first captured video and the second captured video in association with each other with the out-of-synchronization corrected, but the present invention is not limited thereto. For example, the first captured video and the second captured video may be not stored in association with each other with the out-of-synchronization corrected. That is, the first captured video and the second captured video with the out-of-synchronization corrected may be transmitted in association with each other.

In the above-described first to third embodiments, an example is shown in which the recording operation unit for accepting operations for starting recording by the first recording unit and the second recording unit is provided, but the present invention is not limited thereto. For example, it may be configured such that the recording operation unit is not provided and that the first recording unit and the second recording unit perform control for starting recording based on the fact that the determination result of the inspection has been acquired.

In the above-described first and third embodiments, an example is shown in which the out-of-synchronization is corrected by cropping the video for the time corresponding to the out-of-synchronization from one of the recorded first captured video and the recorded second captured video, but the present invention is not limited thereto. For example, it may be configured to correct the out-of-synchronization by cropping a predetermined amount of video from both the first captured video and the second captured video to resolve the out-of-synchronization.

In the above-described second embodiment, an example is shown in which the recording device corrects the out-of-synchronization by measuring the timing information including the first preparation completion information and the second preparation completion information and outputting the recording instruction for starting the recording to the first recording unit and the second recording unit, based on the fact that the timing information has been measured, but the present invention is not limited thereto. For example, it may be configured such that the recording instruction is output to the first imaging unit and the second imaging unit and the recording instruction is output after a predetermined time has elapsed from the time when the preparation instruction is output to the time when the preparation instruction is completed without acquiring the first preparation completion information and the second preparation completion information. That is, the timing information may be time information for waiting for a predetermined amount of time until the preparations are completed.

In the above-described first and third embodiments, an example is shown in which the first start timing is the timing at which the first preparation completion information has been acquired by the first recording unit, and the second start timing is the timing at which the second preparation completion information has been acquired by the second recording unit, the present invention is not limited thereto. For example, the timing at which the recording of the first captured video has been actually started by the first imaging unit may be set to the first start timing. Also for the second start timing, similarly, the timing at which the recording of the second captured video by the second recording unit has been actually started may be set to the second start timing.

Further, in the above-described third embodiment, an example is shown in which the first imaging unit and second imaging unit are configured to image the reference target from which the time information can be acquired at the same timing in order to correct the deviation of the time axis between the first video information from the first imaging unit and the second video information from the second imaging unit, but the present invention is not limited thereto. For example, the first imaging unit and the second imaging unit may image separate reference targets. In other words, two separate reference targets (e.g., two clocks with the time setting aligned) capable of acquiring the common time information can be separately imaged by the first imaging unit and the second imaging unit.

In the above-described third Embodiment, an example is shown in which the reference target includes the reference time indicator for indicating the reference time for correcting the deviation of the time axis between the first video information from the first imaging unit and the second video information from the second imaging unit, but the present invention is not limited thereto. For example, the first imaging unit and the second imaging unit may be configured to perform imaging with flashlight that emits light instantaneously without displaying a time as the reference target.

In this situation, the recording device acquires the first video information and the second video information from the first imaging unit and the second imaging unit imaged the flashlight that emits light momentarily at the same timing and acquires the first reference image and the second reference image as moving images. Then, the recording device measures the deviation between the timing of the light emission of the flashlight in the first reference image and the timing of the light emission of the flashlight in the second reference image by performing image processing on the first reference image and the second reference image as moving images. The deviation of the timing in the moving image is measured, for example, based on the time information measured by the timer unit. Then, the recording device acquires the deviation of the timing of the measured flashlight as the timing information indicating the deviation of the time axis between the first video information and the second video information. The flashlight may blink at regular intervals.

In the above-described first to third embodiments, an example is shown in which the recording of the video information acquired from the time at which the recording instruction is output is started (the processing for recording is started) based on the recording instruction, but the present invention is not limited thereto. For example, it may be configured such that the recording device is provided with a temporary storage unit that temporarily (e.g., five seconds)

stores the video information received by the first receiving unit and the second receiving unit, and retroactively stores the video information stored in the temporary storage unit, based on a recording instruction.

Further, in the above-described first to third embodiments, an example is shown in which the recording device is portable or wearable to the inspection operator, but the present invention is not limited thereto. For example, the recording device may be disposed near the inspection operator (e.g., at the foot). Further, the recording device may also be disposed so as to be fixed to the inspection target.

In the above-described first to third embodiments, an example is shown in which the first imaging unit transmits the first video information via the radio connection, and the second imaging unit transmits the second video information via the wired connection, but the present invention is not limited thereto. For example, both the first imaging unit and the second imaging unit may transmit the first video information and the second video information via wired connections. Further, both the first imaging unit and the second imaging unit may transmit the first video information and the second video information via radio connections.

In the above-described first to third embodiments, an example is shown in which the storage unit is included in the recording device, but the present invention is not limited thereto. For example, the storage unit may be externally connected to the recording device via a cable. Alternatively, the storage unit may be provided at a position spaced apart from the recording device, and the captured video may be stored in the storage unit by transmitting the video via the communication unit.

In the above-described first to third embodiments, an example is shown in which two captured videos are recorded based on the video information captured by two imaging units and the out-of-synchronization of two captured videos is corrected, but the present invention is not limited thereto. For example, it may be configured such that, based on video information from three or more imaging units, three or more captured videos are recorded and the out-of-synchronization of the time axis of the three or more recorded captured videos is corrected.

Further, in the above-described first to third embodiment, an example is shown in which the recording device is used for performing the inspection of the aircraft, but the present invention is not limited thereto. For example, the recording device may be configured to be used for inspecting defects of a bridge, a building, or the like.

In the above-described third embodiment, an example is shown in which the configuration in which the deviation of the time axis between the first video information and the second video information is corrected and the configuration in which the out-of-synchronization of the control processing of the recording between the first captured video and the second captured video by the first recording unit and the second recording unit is corrected are both provided, but the present invention is not limited thereto. For example, it may be configured such that the configuration in which the deviation of the time axis between the first video information and the second video information is corrected is provided, but the configuration in which the out-of-synchronization of the control processing of the recording of the first captured video and the second captured video by the first recording unit and the second recording unit is corrected is not provided.

[Aspects]

It will be understood by those skilled in the art that the above-described exemplary embodiments are concrete examples of the following aspects.

(Item 1)

A measurement recording system comprising:

a plurality of imaging units each configured to capture a video and transmit captured video information; and a recording device including a first recording unit and a second recording unit, the first recording unit being configured to record a first captured video based on first video information from a first imaging unit out of the plurality of imaging units, and the second recording unit being configured to record a second captured video based on second video information from a second imaging unit out of the plurality of imaging units, wherein the recording device is configured to measure timing information for correcting out-of-synchronization of a time axis between the first captured video to be recorded by the first recording unit and the second captured video to be recorded by the second recording unit, and correct the out-of-synchronization to align start timing of the first captured video and start timing of the second captured video, based on the measured timing information.

(Item 2)

The measurement recording system as recited in the above-described Item 1, wherein the first video information includes measuring instrument video information acquired by imaging a measuring instrument-side display unit for displaying measurement information about an inspection target measured by a measuring instrument, wherein the second video information includes inspection target video information acquired by imaging the inspection target in a state of being inspected by an inspection operator, and wherein the recording device is configured to correct the out-of-synchronization to align the start timing between the first captured video to be recorded based on the measuring instrument video information and the second captured video to be recorded based on the inspection target video information.

(Item 3)

The measurement recording system as recited in the above-described Item 2, wherein the first imaging unit is arranged at a position spaced apart from the inspection operator, and wherein the second imaging unit is configured to be portable or wearable to the inspection operator.

(Item 4)

The measurement recording system as recited in any one of the above-described Items 1 to 3, wherein the recording device is configured to correct the out-of-synchronization to align the start timing of the first captured video and the start timing of the second captured video and store the first captured video and the second captured video in a state in which the out-of-synchronization is corrected in association with each other.

(Item 5)

The measurement recording system as recited in any one of the above-described Items 1 to 4, wherein the recording device includes a timer unit for measuring the timing information indicating a time by measuring an elapsed time and is configured to correct the out-of-synchronization based on the timing information measured by the timer unit.

(Item 6)

The measurement recording system as recited in the above-described Item 5, wherein the first recording unit and the second recording unit are configured to start recording the first captured video and the second captured video based on a recording instruction for causing the first recording unit and the second recording unit to start recording, and wherein the recording device is configured to correct the out-of-synchronization of the time axis between the first captured video recorded based on the recording instruction and the second captured video recorded based on the recording instruction.

(Item 7)

The measurement recording system as recited in the above-described Item 6, wherein the timing information includes a first start timing indicating a timing at which the first recording unit starts recording and a second start timing indicating a timing at which the second recording unit starts recording, and wherein the recording device is configured to correct the out-of-synchronization based on a difference between the first start timing and the second start timing.

(Item 8)

The measurement recording system as recited in the above-described Item 6 or 7, further comprising:

a recording operation unit configured to receive an operation for causing the first recording unit and the second recording unit to start recording, wherein the recording device is configured to output the recording instruction based on an input operation to the recording operation unit and correct the out-of-synchronization of the time axis between the first captured video recorded based on the recording instruction and the second captured video recorded based on the recording instruction.

(Item 9)

The measurement recording system as recited in any one of the above-described Items 5 to 8, wherein the recording device is configured to correct the out-of-synchronization by cropping a video for a time corresponding to the out-of-synchronization from at least one of the recorded first captured video and the recorded second captured video based on the timing information measured by the timer unit.

(Item 10)

The measurement recording system as recited in any one of the above-described Items 1 to 9, wherein the timing information includes first preparation completion information output from the first recording unit, the first preparation completion information indicating that preparation for starting recording the first captured video has been completed, and second preparation completion information output from the second recording unit, the second preparation completion information indicating that preparation for starting recording the second captured video has been completed, and wherein the recording device is configured to correct the out-of-synchronization based on the first preparation completion information and the second preparation completion information.

(Item 11)

The measurement recording system as recited in the above-described Item 10, wherein the recording device is configured to measure the timing information including the first preparation completion information and the second preparation completion information and output a recording instruction for causing the first recording unit and the second recording unit to start recording based on that the timing information has been measured to correct the out-of-synchronization.

(Item 12)

The measurement recording system as recited in any one of the above-described Items 10, wherein the first recording unit is configured to output the first preparation completion information and start recording the first captured video, wherein the second recording unit is configured to output the second preparation completion information and start recording the second captured video, and wherein the recording device is configured to correct the out-of-synchronization based on a difference between a timing at which the first preparation completion information is acquired and a timing at which the second preparation completion information is acquired, based on the first preparation completion information and the second preparation completion information.

(Item 13)

The measurement recording system as recited in any one of the above-described Items 1 to 12, wherein the first imaging unit and the second imaging unit are configured to image a reference target capable of acquiring time information at the same timing in order to correct a deviation of the time axis between the first video information from the first imaging unit and the second video information from the second imaging unit, and wherein the recording device is configured to measure the timing information indicating the deviation of the time axis between the first video information and the second video information based on the first reference image in which the first imaging unit imaged the reference target and the second reference image in which the second imaging unit imaged the reference target, and correct the out-of-synchronization based on the measured timing information.

(Item 14)

The measurement recording system as recited in the above-described Item 13, wherein the reference target includes a reference time indicator for indicating a reference time for correcting the deviation of the time axis between the first video information from the first imaging unit and the second video information from the second imaging unit, and wherein the recording device is configured to acquire the first reference image in which the first imaging unit imaged the reference time indicator and the second reference image in which the second imaging unit imaged the reference time indicator and measure the deviation of the time axis between the timing at which the first video information was imaged and the timing at which the second video information was imaged by performing image processing on the acquired first reference image and the acquired second reference image.

(Item 15)

A measurement recording method comprising the steps of:

recording a first captured video based on first video information captured by a first imaging unit out of a plurality of imaging units;

recording a second captured video based on second video information captured by a second imaging unit out of the plurality of imaging units;

measuring timing information for correcting out-of-synchronization of a time axis between the first captured video to be recorded and the second captured video to be recorded; and correcting out-of-synchronization to align a start timing between the first captured video and the second captured video based on the measured timing information.
(Item 16)

The measurement recording method as recited in the above-described Item 15, wherein the step of recording the first captured video is a step of recording the first captured video, based on the first video information including measuring instrument video information acquired by imaging a measuring instrument-side display unit for displaying measurement information about an inspection target measured by a measuring instrument, and wherein the step of recording the second captured video is a step of recording the second captured video, based on the second video information including an inspection target video information acquired by imaging the inspection target in a state of being inspected by an inspection operator.

The invention claimed is:

1. A measurement recording system comprising:
a plurality of imaging units each configured to capture a video and transmit captured video information; and
a recording device including a first recording unit and a second recording unit, the first recording unit being configured to record a first captured video, which includes measurement information of a measuring instrument, based on first video information from a first imaging unit out of the plurality of imaging units, and the second recording unit being configured to record a second captured video, which includes an inspection target measured by the measuring instrument, based on second video information from a second imaging unit out of the plurality of imaging units,
wherein the recording device is configured to:
measure timing information for correcting out-of-synchronization of a time axis between the first captured video to be recorded by the first recording unit and the second captured video to be recorded by the second recording unit, and
correct the out-of-synchronization to align start timing of the first captured video and start timing of the second captured video, based on the measured timing information.

2. The measurement recording system as recited in claim 1,
wherein the first video information includes measuring instrument video information acquired by imaging a measuring instrument-side display unit for displaying the measurement information about the inspection target measured by the measuring instrument,
wherein the second video information includes inspection target video information acquired by imaging the inspection target in a state of being inspected by an inspection operator, and
wherein the recording device is configured to correct the out-of-synchronization to align the start timing between the first captured video to be recorded based on the measuring instrument video information and the second captured video to be recorded based on the inspection target video information.

3. The measurement recording system as recited in claim 2,
wherein the first imaging unit is arranged at a position spaced apart from the inspection operator, and
wherein the second imaging unit is configured to be portable or wearable to the inspection operator.

4. The measurement recording system as recited in claim 1, wherein the recording device is configured to
correct the out-of-synchronization to align the start timing of the first captured video and the start timing of the second captured video and
store the first captured video and the second captured video in a state in which the out-of-synchronization is corrected in association with each other.

5. The measurement recording system as recited in claim 1,
wherein the recording device includes a timer unit for measuring the timing information indicating a time by measuring an elapsed time and is configured to correct the out-of-synchronization based on the timing information measured by the timer unit.

6. The measurement recording system as recited in claim 5,
wherein the first recording unit and the second recording unit are configured to start recording the first captured video and the second captured video based on a recording instruction for causing the first recording unit and the second recording unit to start recording, and
wherein the recording device is configured to correct the out-of-synchronization of the time axis between the first captured video recorded based on the recording instruction and the second captured video recorded based on the recording instruction.

7. The measurement recording system as recited in claim 6,
wherein the timing information includes a first start timing indicating a timing at which the first recording unit starts recording and a second start timing indicating a timing at which the second recording unit starts recording, and
wherein the recording device is configured to correct the out-of-synchronization based on a difference between the first start timing and the second start timing.

8. The measurement recording system as recited in claim 6, further comprising:
a recording operation unit configured to receive an operation for causing the first recording unit and the second recording unit to start recording,
wherein the recording device is configured to,
output the recording instruction based on an input operation to the recording operation unit, and
correct the out-of-synchronization of the time axis between the first captured video recorded based on the recording instruction and the second captured video recorded based on the recording instruction.

9. The measurement recording system as recited in claim 5,
wherein the recording device is configured to correct the out-of-synchronization by cropping a video for a time corresponding to the out-of-synchronization from at least one of the recorded first captured video and the recorded second captured video based on the timing information measured by the timer unit.

10. The measurement recording system as recited in claim 1,
wherein the timing information includes:
first preparation completion information output from the first recording unit, the first preparation completion information indicating that preparation for starting recording the first captured video has been completed, and second preparation completion information output from the second recording unit, the second preparation completion information indicating that preparation for starting recording the second captured video has been completed, and wherein the recording device is configured to correct the out-of-synchronization based on the first preparation completion information and the second preparation completion information.

11. The measurement recording system as recited in claim 10, wherein the recording device is configured to:

measure the timing information including the first preparation completion information and the second preparation completion information and output a recording instruction for causing the first recording unit and the second recording unit to start recording based on that the timing information has been measured to correct the out-of-synchronization.

12. The measurement recording system as recited in claim 10, wherein the first recording unit is configured to output the first preparation completion information and start recording the first captured video, wherein the second recording unit is configured to output the second preparation completion information and start recording the second captured video, and wherein the recording device is configured to correct the out-of-synchronization based on a difference between a timing at which the first preparation completion information is acquired and a timing at which the second preparation completion information is acquired, based on the first preparation completion information and the second preparation completion information.

13. The measurement recording system as recited in claim 1, wherein the first imaging unit and the second imaging unit are configured to image a reference target capable of acquiring time information at the same timing in order to correct a deviation of the time axis between the first video information from the first imaging unit and the second video information from the second imaging unit, and wherein the recording device is configured to:

measure the timing information indicating the deviation of the time axis between the first video information and the second video information based on a first reference image in which the first imaging unit imaged the reference target and a second reference image in which the second imaging unit imaged the reference target, and correct the out-of-synchronization based on the measured timing information.

14. The measurement recording system as recited in claim 13, wherein the reference target includes a reference time indicator for indicating a reference time for correcting the deviation of the time axis between the first video information from the first imaging unit and the second video information from the second imaging unit, and wherein the recording device is configured to acquire the first reference image in which the first imaging unit imaged the reference time indicator and the second reference image in which the second imaging unit imaged the reference time indicator and measure the deviation of the time axis between the timing at which the first video information was imaged and the timing at which the second video information was imaged by performing image processing on the acquired first reference image and the acquired second reference image.

15. A measurement recording method comprising the steps of:

recording a first captured video, which includes measurement information of a measuring instrument, based on first video information captured by a first imaging unit out of a plurality of imaging units;

recording a second captured video, which includes an inspection target measured by the measuring instrument, based on second video information captured by a second imaging unit out of the plurality of imaging units;

measuring timing information for correcting out-of-synchronization of a time axis between the first captured video to be recorded and the second captured video to be recorded; and correcting out-of-synchronization to align a start timing between the first captured video and the second captured video based on the measured timing information.

16. The measurement recording method as recited in claim 15, wherein the step of recording the first captured video is a step of recording the first captured video, based on the first vide information including measuring instrument video information acquired by imaging a measuring instrument-side display unit for displaying the measurement information about the inspection target measured by the measuring instrument, and wherein the step of recording the second captured video is a step of recording the second captured video, based on the second video information including an inspection target video information acquired by imaging the inspection target in a state of being inspected by an inspection operator.

\* \* \* \* \*